US011593481B2

(12) United States Patent
Kerseboom et al.

(10) Patent No.: US 11,593,481 B2
(45) Date of Patent: *Feb. 28, 2023

(54) SYSTEM AND METHOD EMPLOYING VIRTUAL LEDGER

(71) Applicants: Jan Willem Olger Valentijn Kerseboom, Amstelveen (NL); Carlos R. Villamar, Falls Church, VA (US)

(72) Inventors: Jan Willem Olger Valentijn Kerseboom, Amstelveen (NL); Carlos R. Villamar, Falls Church, VA (US)

( * ) Notice: Subject to any disclaimer, the term of this patent is extended or adjusted under 35 U.S.C. 154(b) by 161 days.

This patent is subject to a terminal disclaimer.

(21) Appl. No.: 16/950,408

(22) Filed: Nov. 17, 2020

(65) Prior Publication Data

US 2021/0089653 A1   Mar. 25, 2021

Related U.S. Application Data

(63) Continuation-in-part of application No. 17/088,690, filed on Nov. 4, 2020, which is a continuation-in-part of application No. 16/846,075, filed on Apr. 10, 2020.

(60) Provisional application No. 62/832,786, filed on Apr. 11, 2019.

(51) Int. Cl.
*G06F 21/53* (2013.01)
*G06F 21/56* (2013.01)
(Continued)

(52) U.S. Cl.
CPC .......... *G06F 21/563* (2013.01); *G06Q 10/10* (2013.01); *G06Q 20/0655* (2013.01);
(Continued)

(58) Field of Classification Search
CPC combination set(s) only.
See application file for complete search history.

(56) References Cited

U.S. PATENT DOCUMENTS

2006/0133289 A1* 6/2006 Golle ................. H04W 12/126
370/252
2006/0167784 A1* 7/2006 Hoffberg ............ G06Q 20/401
705/37

(Continued)

OTHER PUBLICATIONS

Hooks IV, J.B. "The Mesh Economy: How Blockchain and Alternative Networks can Bridge the Digital Divide and Facilitate Economic Inclusion," Blockchain Economics: Implications of Distributed Ledgers-Markets, Communications Networks, and Algorithmic Reality, 1, (pp. 251-265). Jan. 29, 2019; available on the world wide web at openthoughtspace.pbworks.com/w/file/fetch/128952675/13_Hooks.pdf.

(Continued)

*Primary Examiner* — Harunur Rashid
(74) *Attorney, Agent, or Firm* — Carlos R. Villamar; The Villamar Firm PLLC

(57) ABSTRACT

A system, method and computer program product for open innovation including an asset valuation device receiving asset information about tangible or non-tangible assets, and generating a valuation signal, based on the asset information; a self-executing code device receiving the valuation signal, and generating a self-executing code signal, based on the valuation signal; an air router device having both a low band radio channel, and an internet router channel for redundant internet communications, and a malicious code removal device for scrubbing malicious code from data received, receiving the valuation signal, and generating a node voting request signal, based on the valuation signal; and a mesh network having a plurality of node devices receiving the node voting request signal, and generating vote confirmation signals, based on the node voting request signal. Computing devices are connected to the node devices to perform problem solving, smart contract processing, and/or cryptocurrency mining.

12 Claims, 23 Drawing Sheets

(51) Int. Cl.
  *G06Q 30/02* (2023.01)
  *G06Q 10/10* (2023.01)
  *G06Q 20/06* (2012.01)
  *H04L 67/12* (2022.01)
  *G06Q 20/38* (2012.01)
  *G06N 5/04* (2023.01)

(52) U.S. Cl.
  CPC ... *G06Q 30/0278* (2013.01); *G06F 2221/034* (2013.01); *G06N 5/04* (2013.01); *G06Q 20/389* (2013.01); *G06Q 2220/00* (2013.01); *G06Q 2230/00* (2013.01); *H04L 67/12* (2013.01)

(56) References Cited

U.S. PATENT DOCUMENTS

| | | | |
|---|---|---|---|
| 2009/0175238 A1* | 7/2009 | Jetcheva | H04W 28/085 370/329 |
| 2010/0257089 A1 | 10/2010 | Johnson | |
| 2012/0221502 A1* | 8/2012 | Jerram | G06Q 30/0256 706/46 |
| 2013/0254298 A1* | 9/2013 | Lorphelin | G06Q 10/06 709/205 |
| 2015/0170671 A1 | 6/2015 | Jerram et al. | |
| 2016/0224951 A1 | 8/2016 | Hoffberg | |
| 2017/0232300 A1* | 8/2017 | Tran | A63B 71/06 434/247 |
| 2018/0041247 A1* | 2/2018 | Zakaria | H04B 3/542 |

OTHER PUBLICATIONS

De La Rosa, J.L. et al. "A Survey of Blockchain Technologies for Open Innovation," In Proceedings of the 4th Annual World Open Innovation Conference. Preprint (pp. 1-27). Mar. 15, 2019; available on the world wide web at easychair. org/publications/preprint_download/168g.
PCT Ser. No. PCT/US21/57947; ISR & WO; mailed Feb. 4, 2022.
PCT International Search Report & Written Opinion, Ser. No. PCTUS2027809, dated Jul. 6, 2020.

* cited by examiner

ENGINE AND PORTFOLIO VIEW

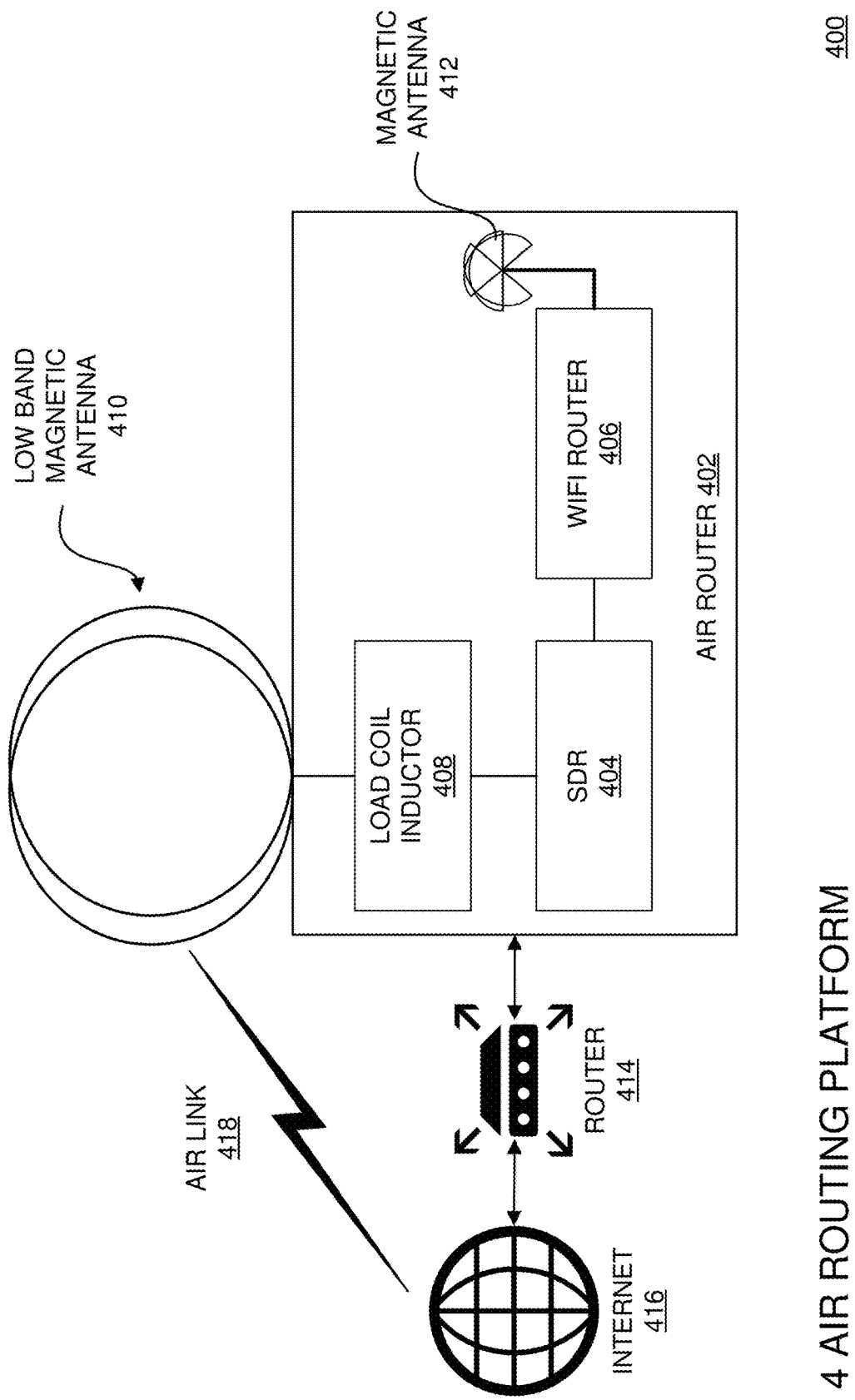
FIG. 4 AIR ROUTING PLATFORM

SYSTEM AND METHOD EMPLOYING VIRTUAL LEDGER

CROSS REFERENCE TO RELATED DOCUMENTS

The present invention is a continuation-in-part of U.S. patent application Ser. No. 17/088,690 of Kerseboom et al., entitled "SYSTEM AND METHOD EMPLOYING VIRTUAL LEDGER," filed on 4 Nov. 2020, now pending, which is a continuation-in-part of U.S. patent application Ser. No. 16/846,075 of Villamar et al., entitled "SYSTEM AND METHOD EMPLOYING VIRTUAL LEDGER," filed on 10 Apr. 2020, now pending, which claims priority to and is a continuation-in-part of U.S. Provisional Patent Application Ser. No. 62/832,786 of Kerseboom et al., entitled "SYSTEM AND METHOD FOR SCRUBBING MALICIOUS CODE BETWEEN COMMUNICATIONS DEVICES," filed on 11 Apr. 2019, the entire disclosures of all of which are hereby incorporated by reference herein.

FIELD OF THE INVENTION

The present invention generally relates to systems and methods for security for communication networks, and more particularly to systems and methods for scrubbing malicious code between communications devices, and the like.

DISCUSSION OF THE BACKGROUND

In recent years, systems and methods for security for communication networks have been developed. However, such systems typically are lacking in effective incorporation of security between communications devices, and the like, in an efficient and cost-effective manner.

SUMMARY OF THE INVENTION

Therefore, there is a need for a method and system that addresses the above and other problems. The above and other problems are addressed by the illustrative embodiments of the present invention, which provide systems and methods for scrubbing malicious code between communications devices, and the like.

Accordingly, in illustrative aspects of the present invention there is provided a system, method and computer program product for open innovation including an asset valuation device receiving asset information about tangible or non-tangible assets, and generating a valuation signal, based on the asset information; a self-executing code device receiving the valuation signal, and generating a self-executing code signal, based on the valuation signal; an air router device having both a low band radio channel, and an internet router channel for redundant internet communications, and a malicious code removal device for scrubbing malicious code from data received, receiving the valuation signal, and generating a node voting request signal, based on the valuation signal; and a mesh network having a plurality of node devices receiving the node voting request signal, and generating vote confirmation signals, based on the node voting request signal. Computing devices are connected to the node devices to perform problem solving, smart contract processing, and/or cryptocurrency mining.

The one or more computing devices include browser capable devices.

The system, method and computer program product collect a predetermined percentage of monetization of assets based on the state of valuation of the assets as a baseline monetization.

Resulting renumeration based on the problem solving, the smart contract processing, and/or the cryptocurrency mining is sent to the baseline monetization.

The node devices process data by themselves or are aligned to perform a single process divided over many of the node devices.

The node devices form an artificial intelligence (AI) engine.

Still other aspects, features, and advantages of the present invention are readily apparent from the following detailed description, by illustrating a number of illustrative embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which:

FIGS. 1A-1D is a diagram for illustrative systems and methods for scrubbing malicious code between communications devices, and the like;

FIG. 4 is a block diagram for illustrating an air router employed in the systems and methods of FIGS. 1-3 and 5-21;

DETAILED DESCRIPTION OF THE PREFERRED EMBODIMENTS

Figure 1A:
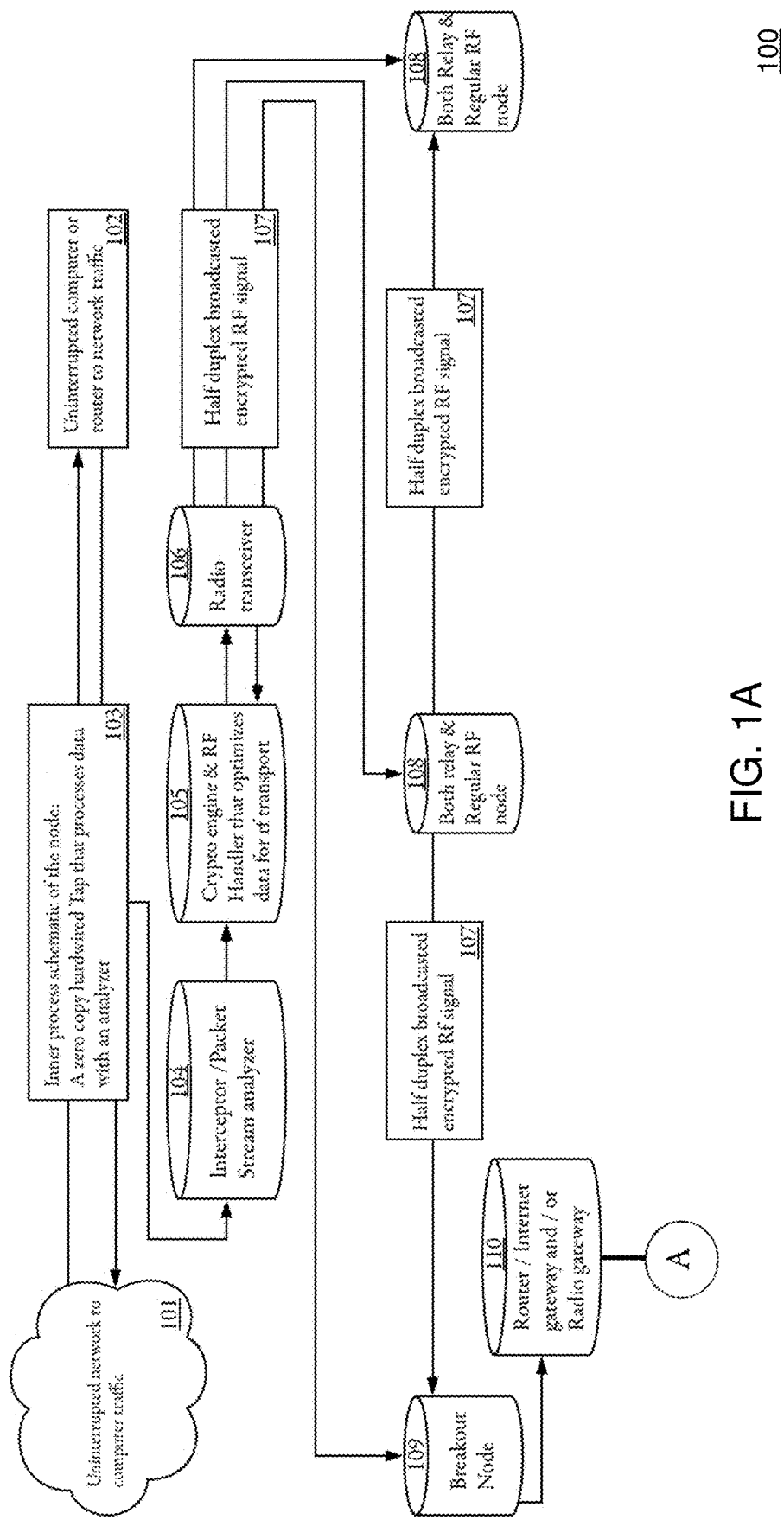
Figure 1B:
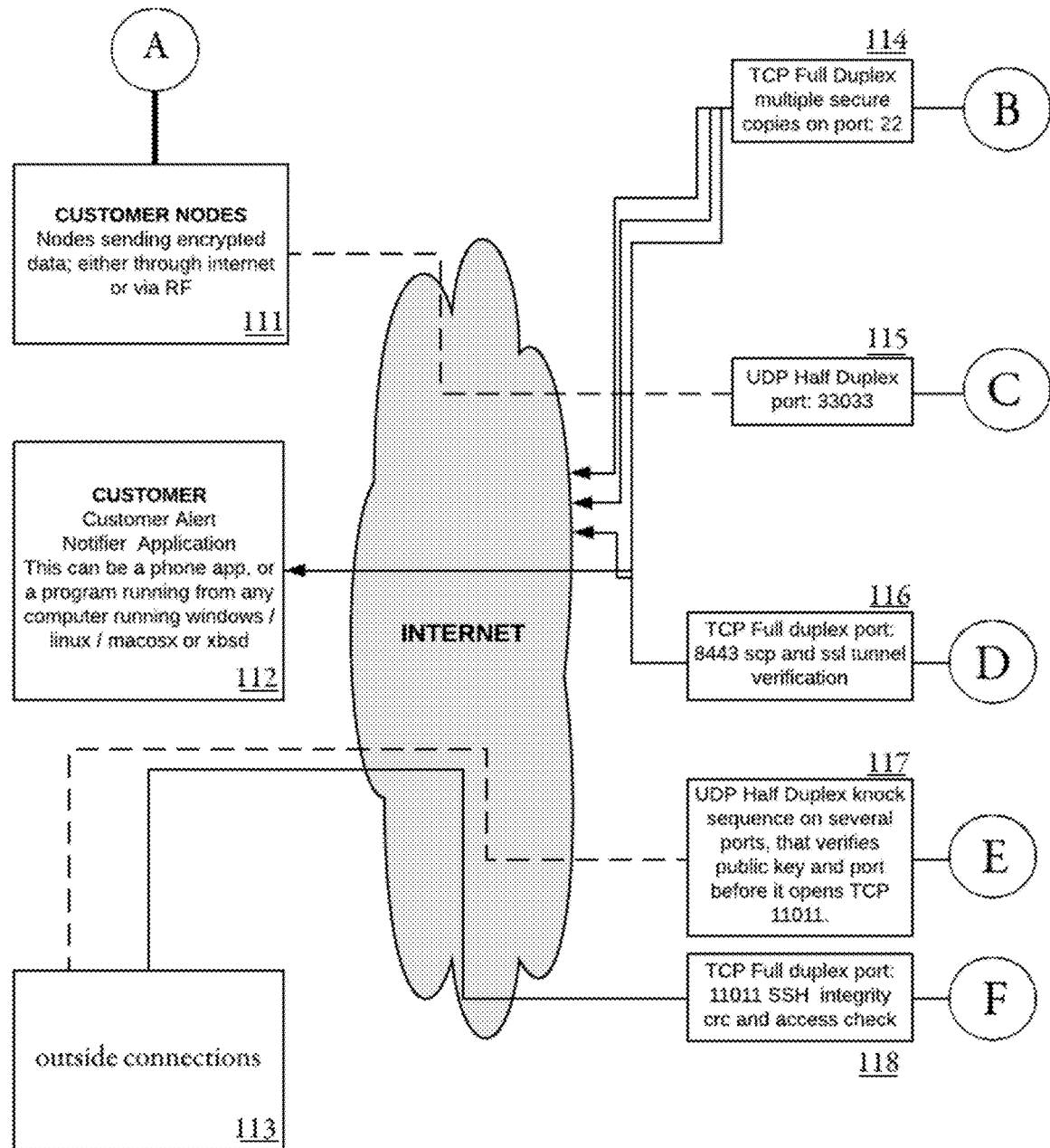
Figure 1C:
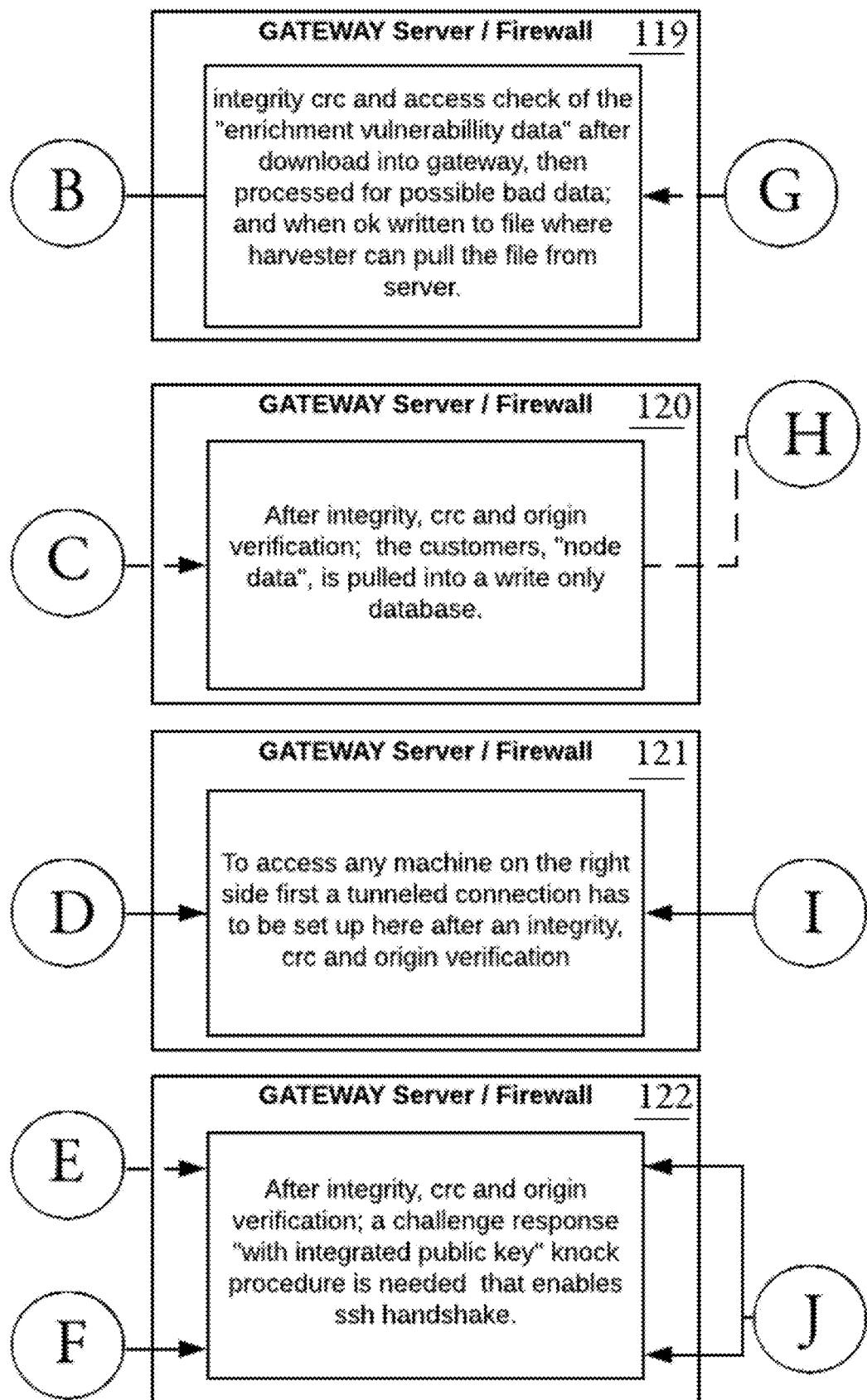
Figure 1D:
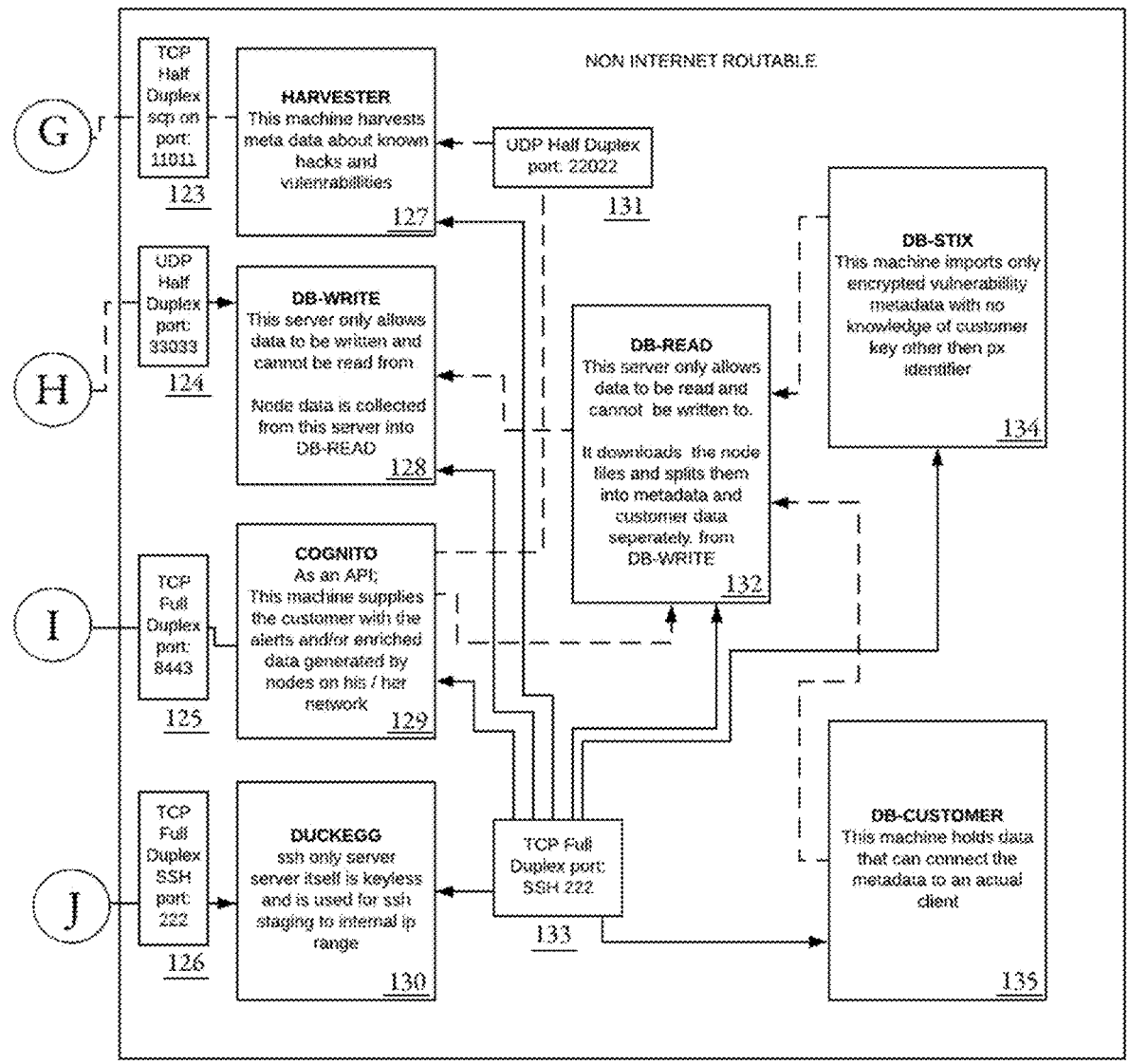

Referring now to the drawings, wherein like reference numerals designate identical or corresponding parts throughout the several views, and more particularly to FIGS. 1A-1D thereof, there is shown systems and methods for scrubbing malicious code between communications devices, and the like.

In FIGS. 1A-1D, an intrinsic depiction of the inner workings of a SUBBC (Scrub/Unify and Break Bad code) system are described, including interception of harmful data, malicious code, and the like, and the way such data is then communicated to other nodes, and ultimately the way they communicate with servers, and the like. The workings of the encryption schemes that are used to protect the customers data before sending it anywhere on either RF or Network are also described.

The Interceptor and crypto engine: (which will be named Custos or 104 hereafter), wherein Custos (104) analyzes all the packets that are sent through the node. It does this in what is called a "zerocopy" setup; which means it picks it up directly from the kernel data stream without delay of copying it to any other service whilst not causing a time delay.

The RF and comm handler: (which will be named Missus or 105 hereafter):

Missus (105) is responsible for communicating messages from node to node, using the out-of-band RF channel, and from node to server, using the in-band channel. It is also responsible for the inline encryption.

Architecture:

Missus (105) runs as a single process with multiple threads. All threads operate on a single data structure and use a mutex to guard against race conditions. This mutex ensures only a single thread can access the data structure at once. The following threads are present:

main: responsible for generating periodic info messages tcp_listen: responsible for handling incoming messages from Custos (104)

rf_receiver: responsible for handing incoming RF packets rf_transmitter: responsible for sending RF packets processor: responsible for handling received RF packets and preparing RF packets for sending transmitter: responsible for sending UDP packets Internally, the data structure tracks stream objects. Each stream object represents a (partial) message and a follow-up action for the node. Whenever a message is received from Custos (104), through the tcp_listen thread, a stream is created and scheduled for transmission, either through the transmitter thread, in case of a breakout node, or through the rf_transmitter thread.

Communication:

Missus (105) creates a local TCP socket on the loopback adapter which is able to receive analysis objects from Custos (104). This TCP socket is only able to receive messages on the local system and is checked for integrity. Messages intended for the server are encoded from a rust struct into an array of bytes. The breakout nodes use a public-key encryption scheme to encrypt and sign messages before sending them to the server. In this scheme, both parties have some a priori knowledge, set up before deployment of the node.

The breakout node has an encryption keypair, including a public key and a secret key: (Npk, Nsk). The server also has an encryption keypair: (Spk, Ssk). Both parties have a priori knowledge of each other's public key. This allows the breakout node to perform an offline encryption of the message, using a key derived from (Nsk, Spk), and this allows the server to perform an offline decryption of the message using (Ssk, Npk). Currently the public key encryption is implemented using X25519 (Elliptic Curve Diffie-Hellman (ECDH) over Curve25519) keys, the XSalsa20 cypher and Poly1305 authentication.

In-band communication:

For in-band communication, certain nodes will be assigned to act as a "breakout" node. Breakout nodes have the capability to inject ethernet frames on a network line. By doing so, this allows a breakout node to communicate with an external server.

Because the nodes operate in a passive/tap configuration where they are not an active part of the network, the nodes will need to borrow/spoof settings for an active network interface in order to craft packets that can be routed from the local network to our server. For this purpose, the node will use the interface settings from (one of) the endpoint node(s) it is protecting. Thus, any suitable packet sent by a breakout node, designated for our server, will have an origin media access control (MAC) and internet protocol (IP) address of the endpoint node.

This also implies that the nodes cannot use any stateful protocol (e.g., like TCP) because that employs the node performing a handshake, in which both parties involved need to send packets. Any data returned from the server will be routed to the endpoint behind our node. Since the node has a passive role on the network, it is unable to intercept response traffic. To overcome these issues, the breakout node communicates to the server using UDP packets. Whenever the node has a message for the server, the message is encoded into one or more UDP packets. If the server would reply to this traffic, the node would be able to observe and isolate the response traffic and the endpoint node would simply drop or ignore the UDP response packet.

Out-of-Band Communication:

For out-of-band communication, between nodes, a hardware RF adapter is used. The adapter is accessed through a serial interface. The RF layer operates on a specific channel (frequency, bandwidth and baud-rate). The RF layer identifies a network using a four-byte identifier. Within a network, each message sent is received by all nodes in range, so each message is broadcasted to all nodes on the network. Each node on the network has a unique two-byte identifier.

Format and Encryption:

The RF uses two layers of encryption, a hardware layer and a software layer. Messages intended for the server are encoded from a rust struct into an array of bytes.

Format:

The RF adapter sends and receives messages in packets of 60 bytes. When a node needs to send a message, the message is split into two or more chunks of 60 bytes. Additional space is divided over the messages using a custom padding scheme.

Encryption in the Software Layer (105):

The breakout nodes use a public-key encryption scheme to encrypt and sign messages before sending them to the server. In this scheme, both parties have some a priori knowledge, set up before deployment of the node. The breakout node has an encryption keypair, including a public key and a secret key: (Npk, Nsk). The server also has an encryption keypair: (Spk, Ssk). Both parties have a priori knowledge of each other's public key. This allows the breakout node to perform an offline encryption of the message, using a key derived from (Nsk, Spk), and this allows the server to perform an offline decryption of the message using (Ssk, Npk). Currently the public key encryption is implemented using X25519 (Elliptic Curve Diffie-Hellman (ECDH) over Curve25519) keys, the XSalsa20 cypher and Poly1305 authentication. The software encryption layer uses an X25519 encryption scheme and an Ed25519 authentication scheme. In this scheme several keypairs are involved:

Ed25519 master signing key (MSpk, MSsk)
Ed25519 node signing key (NSpk, NSsk)
X25519 network key (Npk, Nsk)
X25519 node ephemeral key (NEpk, NEsk)

Before deployment, each node generates a signing key NS. Using the master key MS a signature S_NS=Sign(NSpk, MSsk) is generated. Each node has a priori knowledge of MSpk, allowing each node to verify the signature S_NS. During operation, each node generates an ephemeral key NE and signs it with their signing key NS: S_NE=Sign(NEpk, NSsk). When a node announces itself on the network, it sends its ephemeral public key NEpk, the signature S_NE, the verification key NSpk and the signature S_NS. This allows a verification that the node was accepted by the master key, by validating the signature S_NS against the public key MSpk. This also allows a verification that the provided ephemeral key was generated by the node, by validating the signature S_NS against the public key NSpk. And it allows decryption of messages using Nepk.

Encryption in the Hardware Layer (105):

The RF adapter uses a hardware AES-256 encryption engine. All nodes on a network have a priori knowledge of the 16-byte hardware key. The key is programmed into the adapter before operation. Nodes perform no active operations on the hardware encryption. Each packet sent to the adapter is transparently encrypted before being sent and also decrypted before being received at the serial level.

Obfuscation and Misdirection (105):

A Cryptographic engine and RF handler that optimizes and obfuscates data for transport. In Communicating with the outside a form of obfuscation is used; the goal is to misdirect attempts to decrypt and read the data the system is protecting. This is done by employing entropic obfuscation by adding seemingly random bytes that are added in a specific order that is based on the total data that is being sent. Furthermore, headerless compression is added to the now obfuscated finalized encrypted data.

The collection and re-assembly of this data that could be harvested with a presumed "man in the middle or replay" attack, becomes exponentially more difficult, if not impossible. As the data itself is now deliberately corrupted and can be harvested by decompilation in the exact same way as described above. The nonce (a nonce is an arbitrary number that can be used just once in a cryptographic communication), is a 24 bit random sequence that safeguards the key entropy needed to encrypt the messages correctly. This is sent via the first packet of a stream called "header." The systems on both sides therefore can extrapolate the data on both sides. As a nonce is only used once, this means that this nonce sets the bandwidth of the used entropy. The maximum of data sent is within a single encryption parameter, below any reasonable minimum employed for re-assembling this data; thus thwarting or frustrating any hack attempt.

Radio Transceiver (106):

A radio transceiver that broadcasts messages to other nodes or on to a network.

Data Scrubber (105):

The data scrubber is used to replace "Bad data/executable code" with benign data. It receives the data size and mathematical parameters employed from (104). It then creates a harmless equivalent of this data block. When this is done it performs a cyclic redundancy check (CRC), to see if it complies with the data stream it was taken from, and is in fact of the same value mathematically, but has become harmless data instead. This process can be done separately with both incoming data, "(E1)" and outgoing data, "(E2)" packets.

Bump in the Wire (103):

TG1 and G2 are rj45 connectable bump in the wire like sockets. They function to intercept/become an in-between on a rj45cable.

Network Data Traffic Source (101 and 102):

A1=Any Network data traffic source.

A2=Any Computer or router connected to the data traffic source.

Another System Identical to (108):

Another SUBBC system that is being warned about an attack over it's radio comm channel.

Half Duplex RF Signal (107):

Element 107 are representations of half duplex channel communications from node to node.

Networked Communication:

Networked communication between servers and Nodes and client hardware (elements 111, 112, 113, 114, 115, 116, 117, and 118):

Element 111: halfduplex push connections made from customer nodes to update servers with client network info.

Element 112: connection for pulling data to customer including enriched data about data that was delivered with 111.

Element 113: outside connections can be made through a secured buffer machine to the servers for maintenance and control.

Element 114: enrichment data is pulled from the web to specific sources that include vulnerability databases.

Element 115: half duplex push connections made from enriched database server to customers.

Element 116: access verification tunnel between customer and Api server.

Element 117: access verification (knock sequence) tunnel between maintenance crew and servers Element 118: after verification layer 1 (117) has taken place secondary verification takes place based on shared key ssh sequence.

Element 119: An isolated gateway that collects outside enrichment data and does integrity checks.

Element 120: An isolated gateway that checks for the integrity of node communication.

Element 121: An isolated gateway that does a secondary integrity check of above-described communication (120).

Element 122: An isolated gateway that provides a pinhole into the server network for maintenance purposes. In order to communicate through this pinhole; a series of verifications is needed via (122). it then connects to (130), thereafter it gives access to elements 131 to 135.

Element 123: outgoing half duplex tcp communication to (119).

Element 124: incoming half duplex tcp communication to (128)

Element 125: full duplex communication between (121) and (129)

Element 126: full duplex communication between (122) and (130)

Element 127: this server harvests and stores informational meta data about viruses, malware, network and other vulnerabilities, that is available on the internet.

Element 128: This is a half-duplex, "write to only", database where customer meta data can be stored for processing.

Element 129: This is an API server that supplies the customer with alerts and enriched meta data.

Element 130: This is a secured staging server to connect to the servers on inner local level of the servers connected to a local network Element 131: half duplex communication between "incoming (127)" and "outgoing (129)"

Element 132: Half duplex read only database server.

Element 133: ssh full duplex communication between (113) via (122) to and from all the internal connected servers (127, 128, 129, 130, 132, 134, and 135)

Element 134: encrypted database server where all customer meta data is housed that is collected from (111, 119, and 132)

Element 135: encrypted database server where all customer data and customer related encryption keys are housed that gives the ability to decrypt the data from server (134). which then in turn is served to (132) and becomes readable to only specific customer coming from (112).

Advantageously, the illustrative systems and methods allow for efficient and cost-effective scrubbing of malicious code between communications devices, and the like.

Although the illustrative systems and methods are described in terms of efficient and cost-effective scrubbing of malicious code between communications devices, and the like, the illustrative systems and methods can be applied to any other suitable types of security applications, as will be appreciated by those of ordinary skill in the relevant arts.

Figure 2:
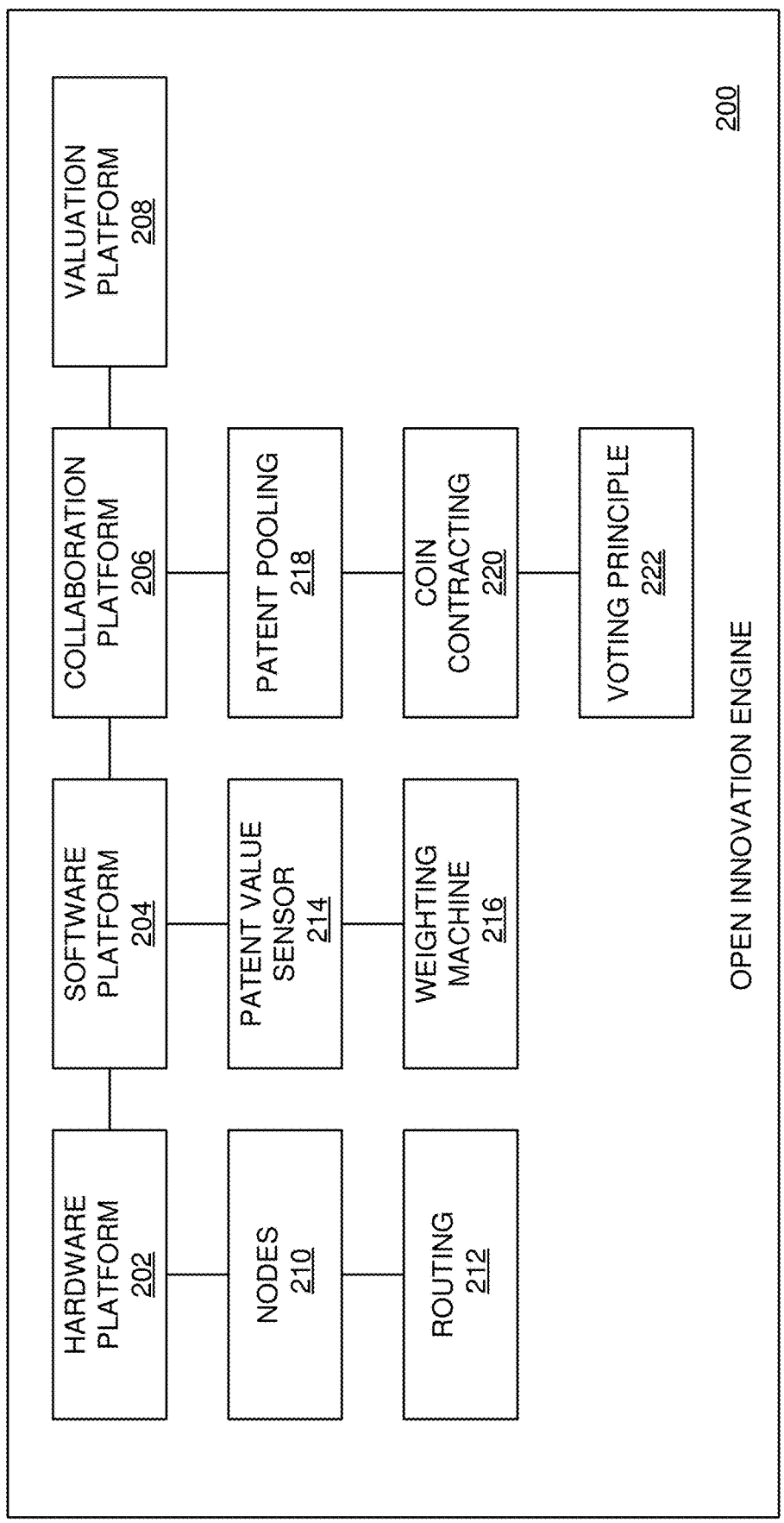
FIG. 2 is a diagram for illustrating systems and methods for an innovation engine, based on FIGS. 1 and 3-21.

And further illustrative embodiments, the systems and methods of FIGS. 1-2, advantageously, can be employed to configure an open innovation ecosystem, as will further described with respect to FIGS. 2-21. For example, FIG. 2 shows a diagram for illustrating systems and methods for an innovation engine, based on FIGS. 1 and 3-21. In FIG. 2, four illustrative elements, hardware platform 202, software platform 204, collaboration platform 206, and valuation platform 208, and the like, with respective interacting elements, nodes 210, hardware routing 212, patent value sensor 214, weighting machine 216, patent pooling device 218, coin contracting device 220, voting device 222, and the like, can make up the innovation engine.

Advantageously, the hardware platform 202, the software platform 204, the collaboration platform 206, and the valuation platform 208 are the illustrative platforms that subsequently are made up of the nodes 210, the hardware routing 212, the patent value sensor 214, the weighting machine 216, the patent pooling device 218, the coin contracting device 220, the voting device 222, and the like, provide for an efficient, robust and secure system implementation. For example, in the hardware platform 202, the nodes 210 can employ the routing hardware 212 to transmit and receive data sent within the mesh network 518, as further described. Such functionality can employ internet communications via conventional routing and/or by employing a redundant, over air routed network or skywave 402, as further described. Furthermore, both the air router 402 and the nodes 510, and the like, as further describe, advantageously, can provide a secondary channel for redundancy, data integrity, scrubbing of malicious code, security checks, and the like.

The software platform 204 harvests content (e.g., relating to intellectual property, patents, other assets, etc.) from the hardware platform 202, and automatically values the content (e.g., performs rule-based, artificial intelligence (AI)-based patent valuation, etc.) with patent value sensor 214, and weighting machine 216. When the content is weighted, it is then presented to a collaboration platform 206, and the like. A patent pooling device 218 can be used to merge the new patent data (e.g., ownership, inventorship, terms, features, updated valuations, etc.) in an asset storage device 504, as further described, that is then offered to the node(s) that include a coin contract 220 (e.g., blockchain-based, smart-contract-based, etc.) for that node(s), and after which synchronization, and the like, is performed with the valuation platform 208 and the asset storage device 504. Thereafter, voting automatically takes with the automated voting device 222, and the like, for example, which can include an automated system that presents users with a vote with respect to the already weighted data, as described above.

Figure 3A:
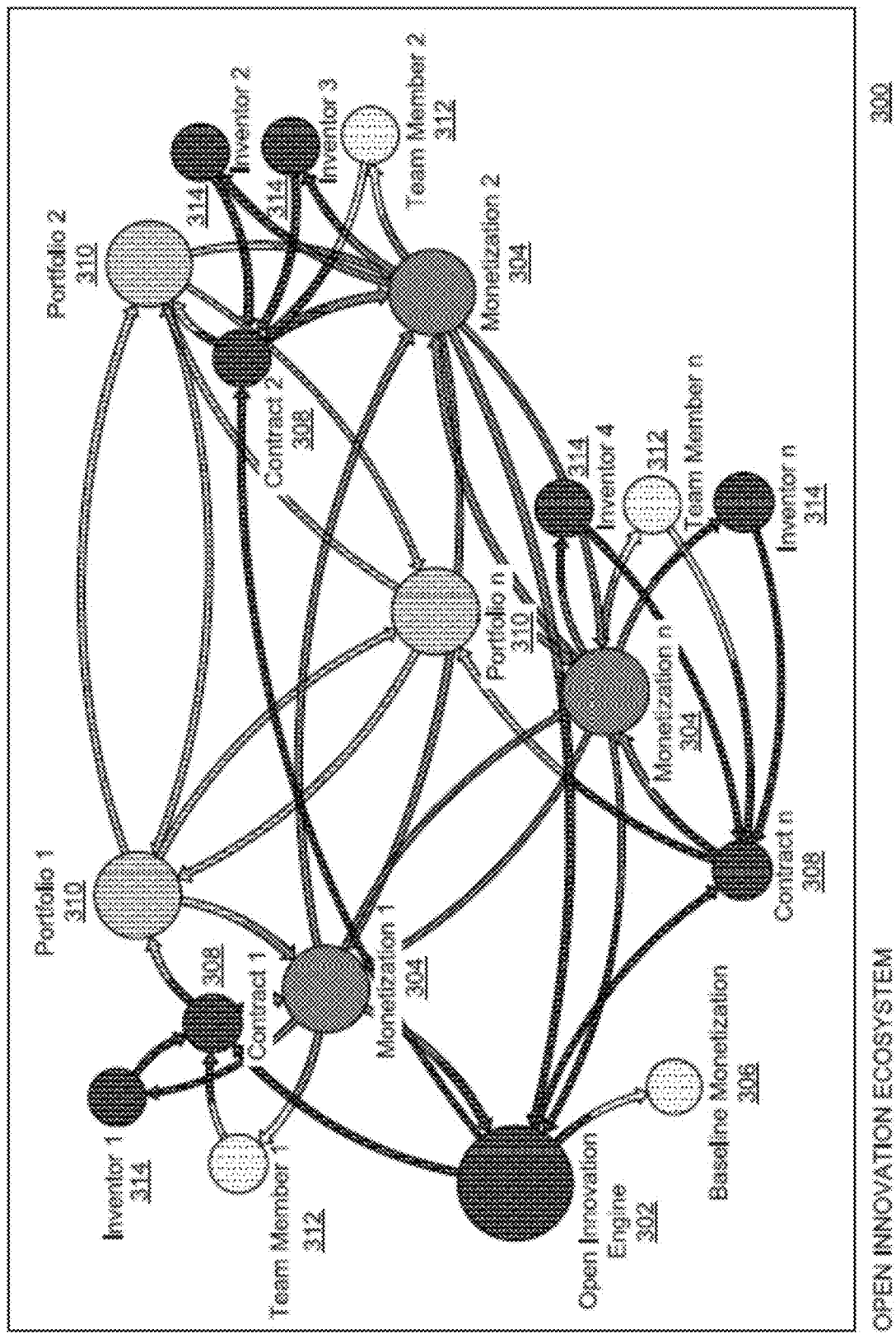
FIGS. 3A-3F are diagrams for illustrating systems and methods for an innovation ecosystem, based on FIGS. 1-2 and 4-21.
Figure 3B:
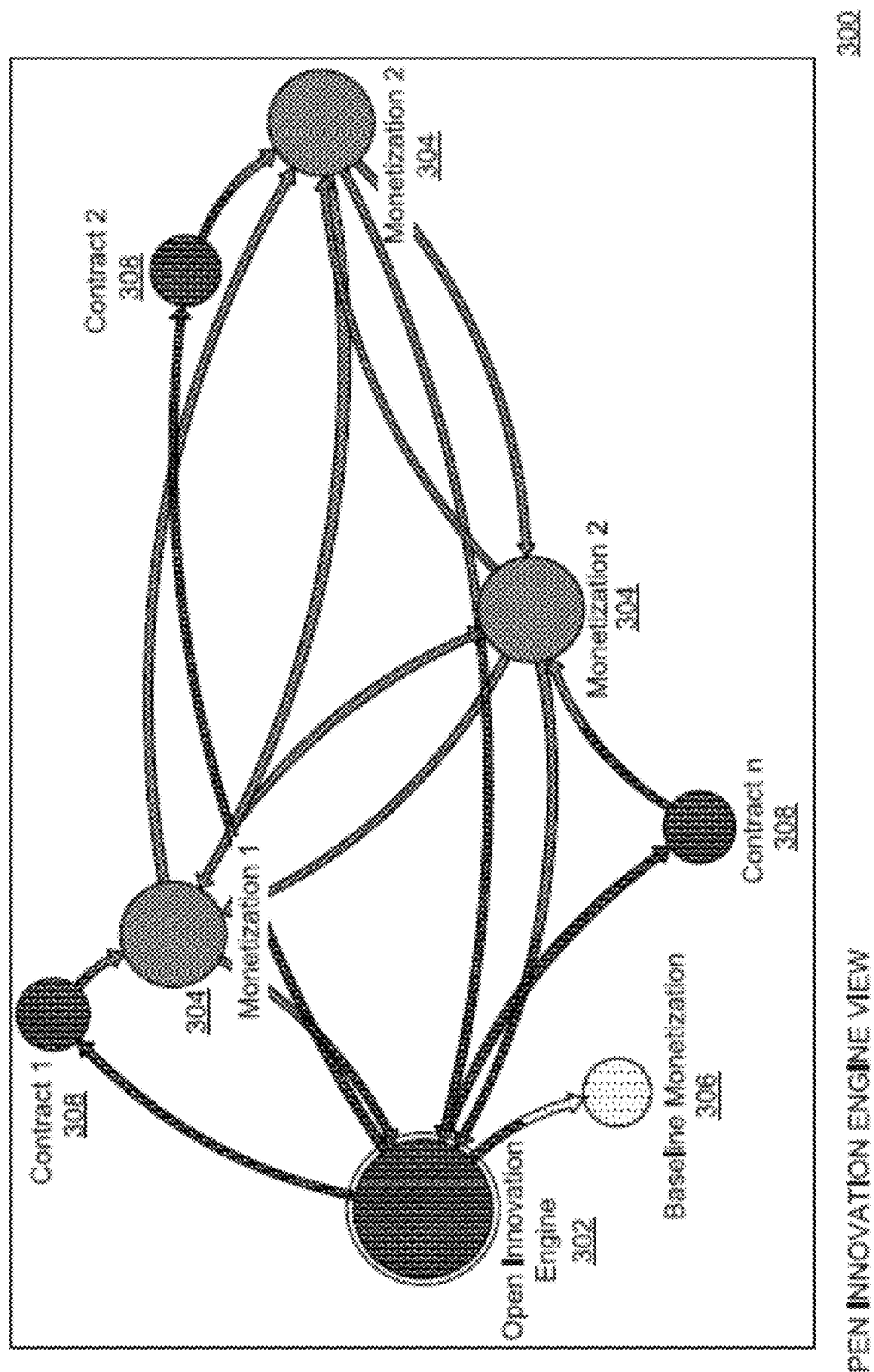

FIGS. 3A-3F are used to Illustrate systems and methods for an open innovation ecosystem based on FIGS. 1, 2 and 4-21. In FIG. 3A, the systems and methods for the open innovation ecosystem 300 can include an open innovation engine 302, a baseline monetization 306 (e.g., 10%, etc.), one or more monetization events (e.g., portfolio sales, profits from startups, products and/or services, etc.) 304, one or more inventors 314, one or more team members 312 (e.g., patent attorney team members, finance team members, marketing team members, etc.), one or more smart contracts 308 (e.g., Blockchain smart contracts, etc.), and one or more portfolios (e.g., patent portfolios, etc.) 310. Accordingly, the one or more groups of inventors 314, and team members 312 can enter into respective smart contracts 308 with respect to terms for development and the monetization 304 of the portfolios 310. The open innovation engine 302 collects a baseline monetization 306 for operating costs, to fund further projects, and the like. As the open innovation ecosystem 300 is based on distributed technology (e.g., blockchain, etc.), tokens (not shown) can be issued based on computer generated valuations (e.g., AI-based, ruled based, blockchain-based, etc.) of the respective portfolios 310, and the like. When one or more of the portfolios 310 lead to the monetization events 304, the tokens can increase in value and be distributed to the baseline monetization 306, and the respective team members 312, and the inventors 314, based on terms agreed to within the respective smart contracts 308.

Figure 3C:
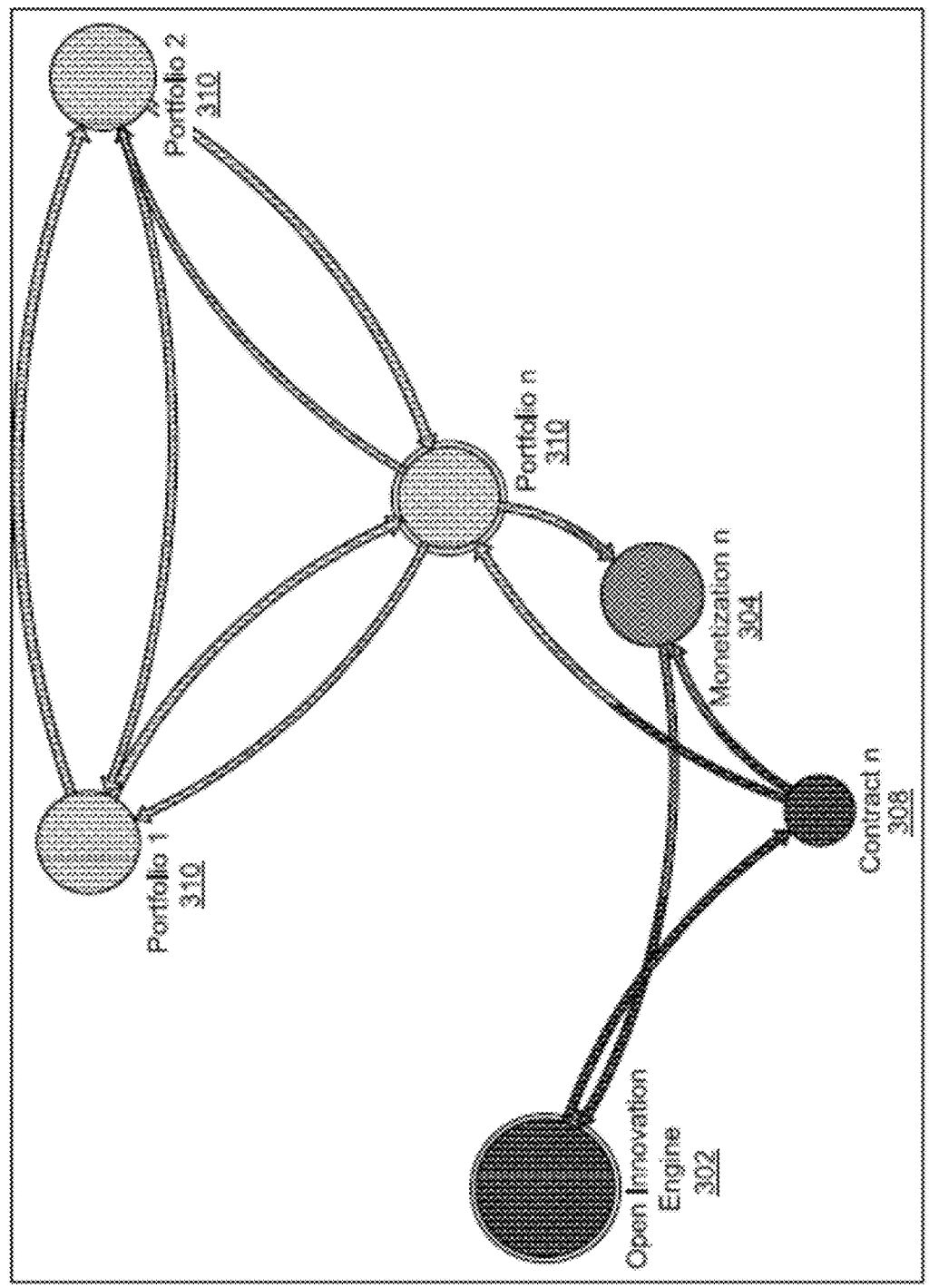
Figure 3D:
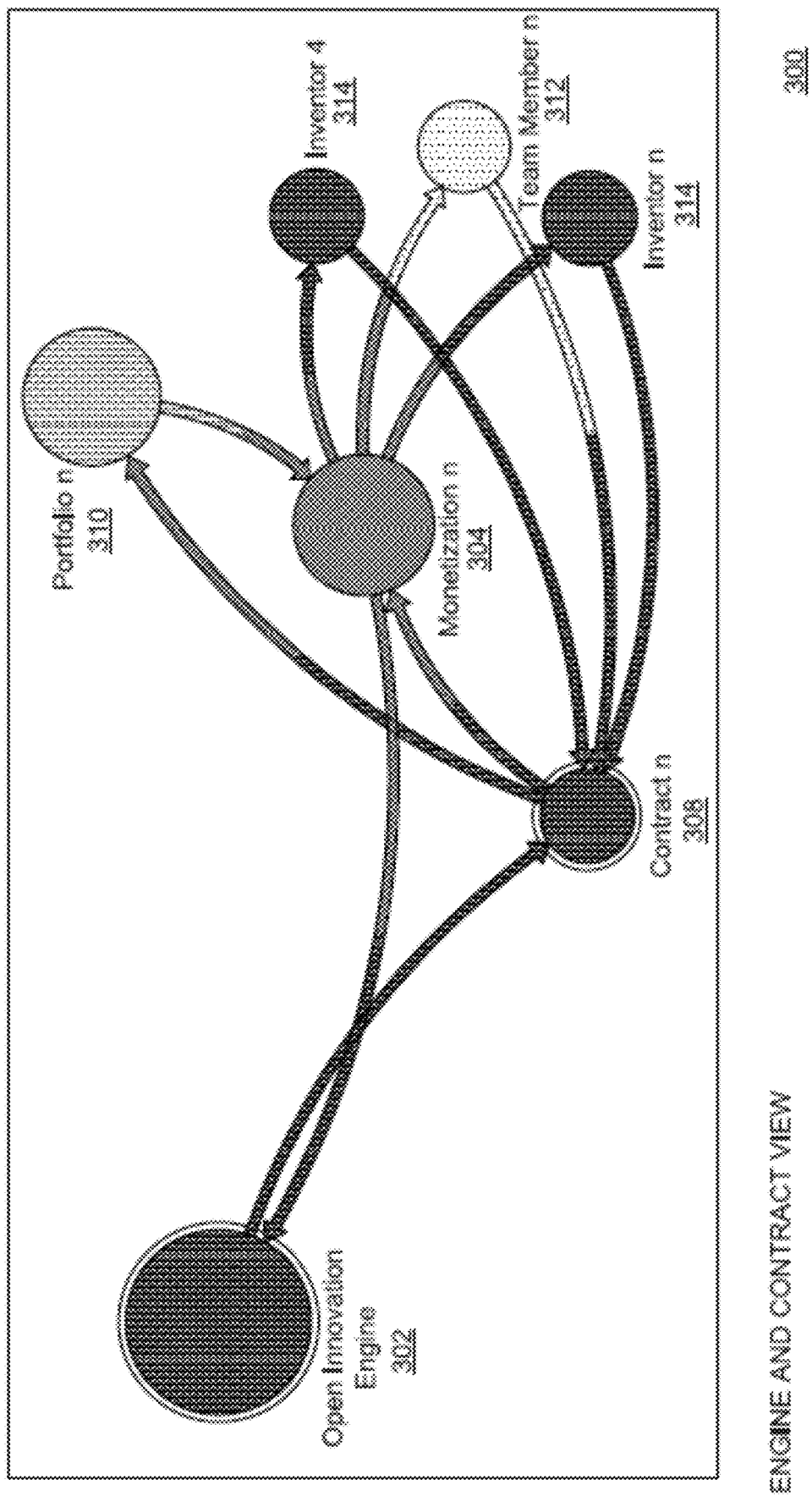
Figure 3E:
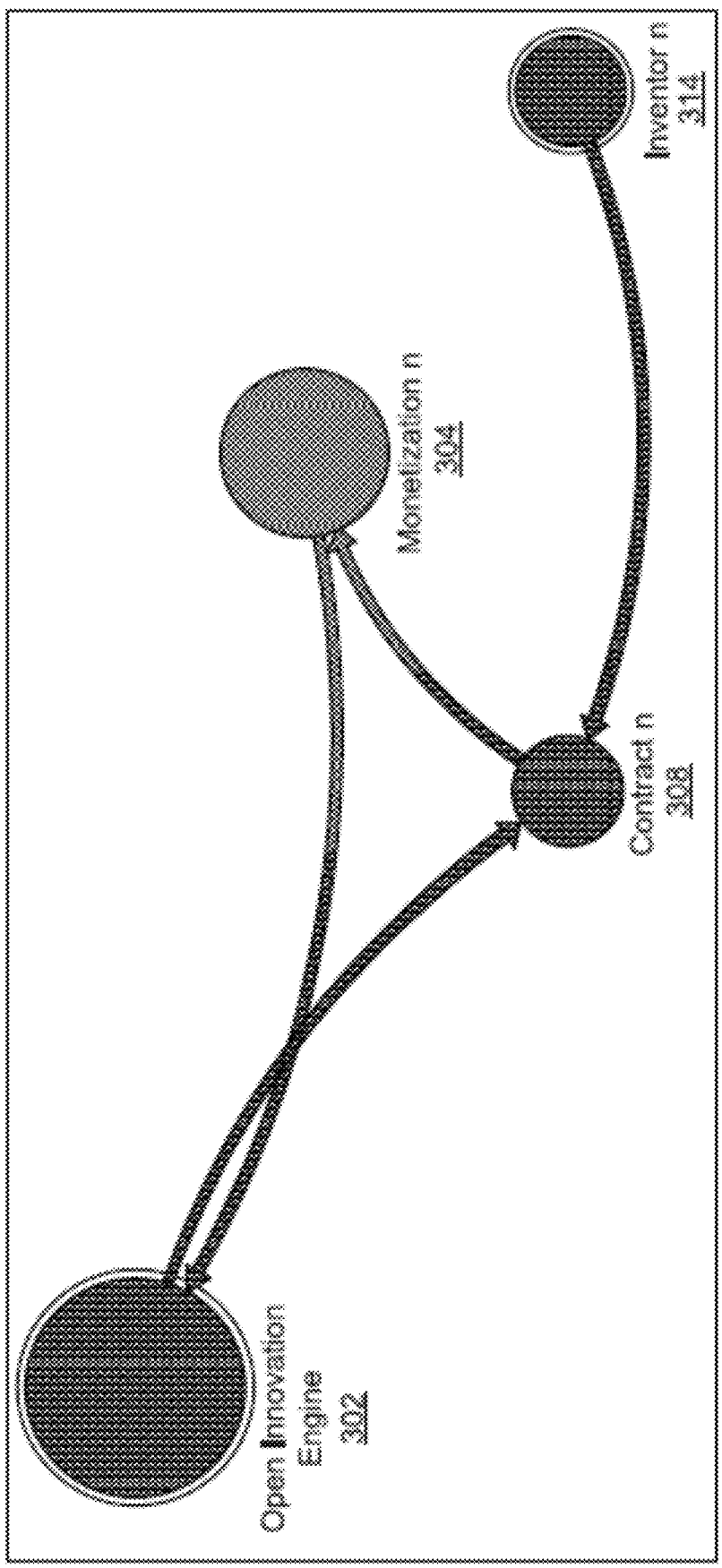
Figure 3F:
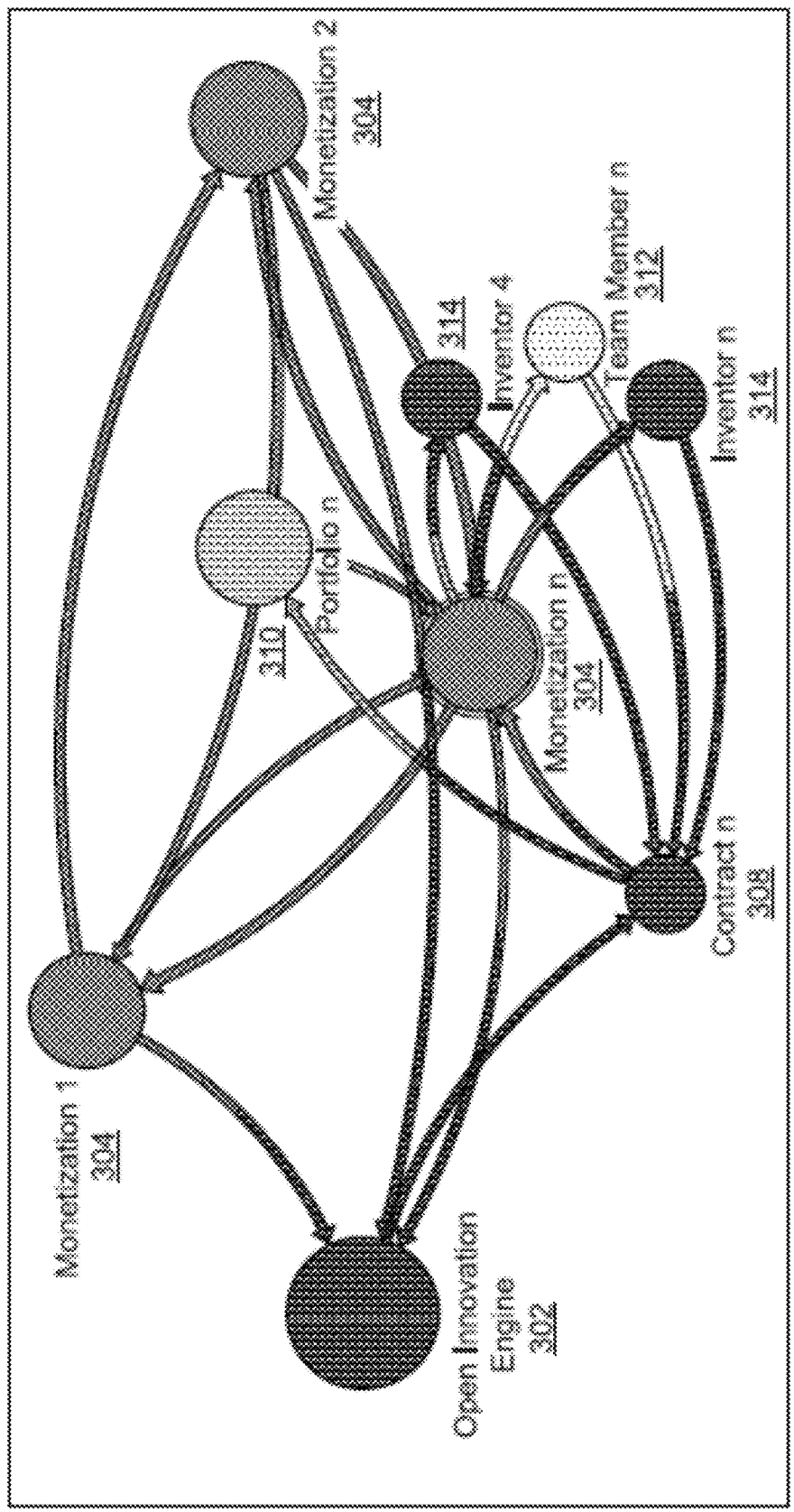

FIGS. 3B-3F are used to illustrate various views from the various components of the open innovation ecosystem 300 of FIG. 3A. For example, in FIG. 3B, there is illustrated a view from the open innovation engine 302 point of view, with respect to the smart contracts 308, the monetization events 304, and the baseline monetization 306. In FIG. 3C, there is illustrated a view from the open innovation engine 302 and the portfolios 310 point of view, with respect to one of the smart contracts 308 with the monetization event 304, and the respective shared portfolios 310. In FIG. 3D, there is illustrated a view from the open innovation engine 302 and the contracts 308 point of view, with respect to the smart contracts 308, the corresponding monetization event 304 of the portfolio 310, and the corresponding inventors 314, and team members 312. In FIG. 3E, there is illustrated a view from the open innovation engine 302 and the inventors 314 point of view, with respect to the smart contracts 308, and the corresponding monetization event 304 of the portfolio 310 (not shown). In FIG. 3F, there is illustrated a view from the monetization event 304 point of view, with respect to the open innovation engine 302, the smart contract 308, the portfolio 310 with the monetization events 304, and with the respective inventors 314, and the team members 312.

FIG. 4 is a block diagram for illustrating an air router employed in the systems and methods of FIGS. 1-3 and 5-21. In FIG. 4, advantageously, the illustrative method and system can employ an air router 402 for sending data, for example, over a lowland frequency, and the like, via antenna 410 that is capable of using a skywave air link 418 (e.g., skywave or skip refers to the propagation of radio waves reflected or refracted back toward Earth from the ionosphere, etc.) for connection to the internet 416 and/or via the router 414, and the like. With the use of a load coil inductor 408, and a software defined radio (SDR) 404, a full duplex signal is created to maintain a data channel that can connect to other users with similar hardware setups, and the like. The incoming signal from the SDR 404 is translated to IP routable traffic, in the send and receive directions, and the like. A WiFi router 406 with magnetic antenna 412 can be employed for connecting to a WiFi network, and the like. Advantageously, the created IP-routable network can send and receive data over the sky-wave link 418 for added redundancy, security, voting, and the like. In order to maintain data integrity, any suitable radio data protocols (e.g., ft8, jt65, jt9 ft4, ask, rtty, etc.) can be employed. Accordingly, the radio routed data can employ integrity, security, and the like, protocols, as described with respect to FIG. 1A.

Figure 5:
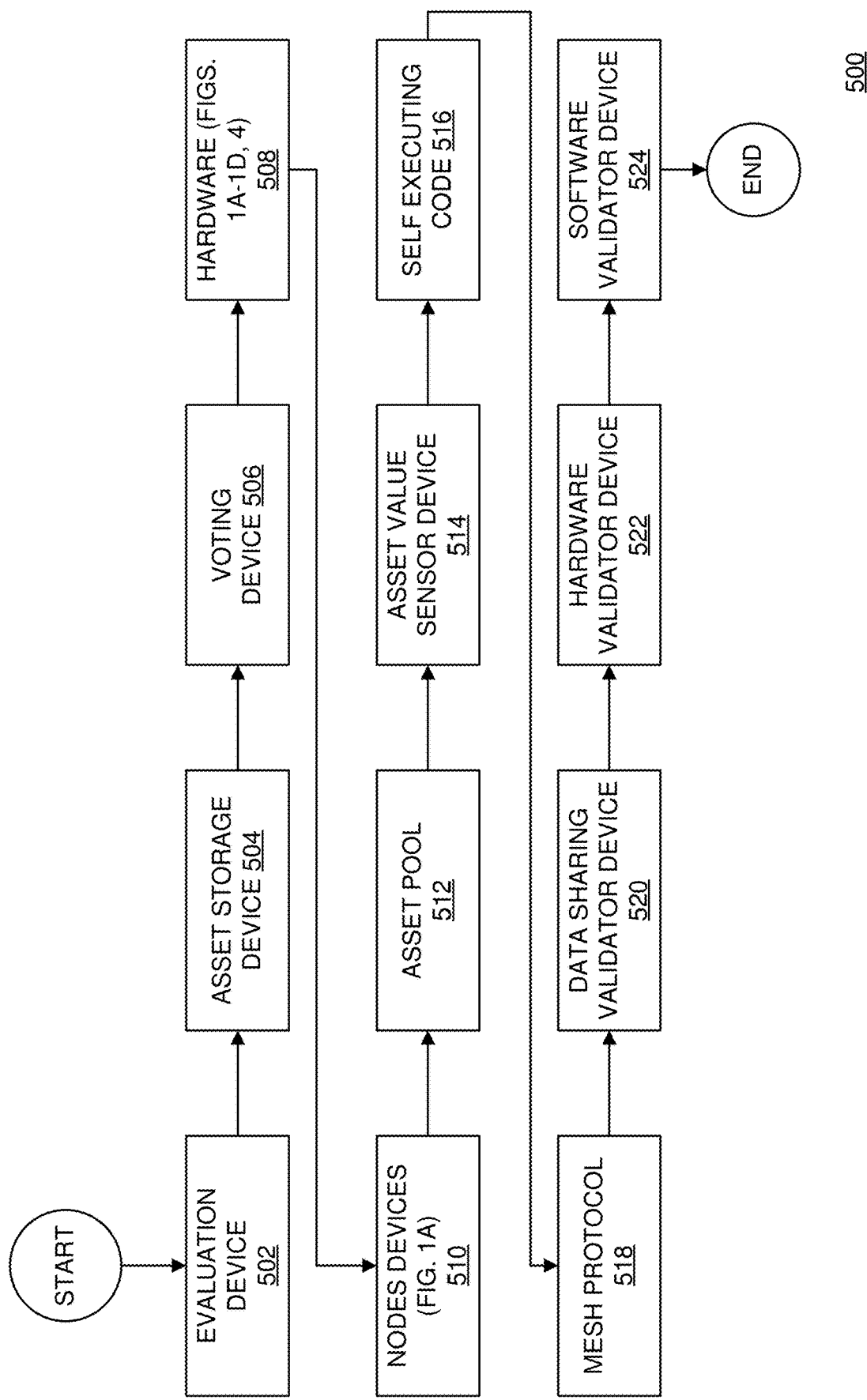
FIG. 5 is a flowchart for illustrating components employed in the innovation engine of FIGS. 1-4 and 6-21.

FIG. 5 is a flowchart for illustrating components employed in the innovation engine of FIGS. 1-4 and 6-21. In FIG. 5, elements of the innovation engine are ordered in way, for example, with respect to how information related to a patent, and the like, flows to determine a valuation thereof for the innovation engine. An evaluation device 502 can calculate value by employing any suitable AI algorithm, and the like, that can weight a value of a patent, and the like. For example, evaluation at step 502 can employ automated verification and weighting of various patent-related parameters, such as forward citations (e.g., at a ~45% weight, etc.), age of patent from priority date (e.g., at a ~19% weight, etc.), independent claim count (e.g., adjusted by number of means-plus-function claims, etc.) (e.g., at a ~14% weight, etc.), claim word count (e.g., one or more of the independent claims at a ~12% weight, etc.), family size and international filings (e.g., at a ~10% weight, etc.), and the like. Then, when the initial evaluation is complete, the relevant information can be sent to an asset storage device at step 504. The asset storing step 504, stores the patent information, for example, divided across several databases, and the like, advantageously, ensuring quick lookups, queries, updated, retrieval, and the like. Advantageously, such data and resulting information can be grouped by interest, patent content, technology area, patent classifications, and the like, employing any suitable AI-based system, and the like.

After such grouping, and the like, the data, related information, and the like, can be shared over the network at step 518 using a mesh protocol, and the like, to then be voted on by individual nodes of the mesh network at step 510, and with software validation at step 524, to check for data originality, viability, and the like. Such evaluation can be performed by a voting device at step 506, for example, which can be implanted on the hardware and software described with respect to FIGS. 1A-1D and 4 at step 508, the node devices at step 510, and the validator devices at step 522, and the like. After performing such operations, and the like, employing security, integrity, validation, validity checks, and the like, the information is sent to the asset pool step 512, where the patent information, and the like, can employ information containers, and the like, that are tailored so as to be accessed by programs, and the like, that search for specific data similarities, and the like. An asset value sensor step 514, for example, determines if there are elements from the asset pool step 512 that can be added to individual chains of self-executing code (e.g., smart contract-based, blockchain-based, etc.) at step 516.

Advantageously, step 516 determines, for example, an overall value for a contract holder, and the like. For example, the self-executing code at step 516, as a whole, can be a value holder that can recalibrate value to a respective owner with help of a ledger that is kept within code, thereof, and the like. Such container employed at step 516, for example, can include the original content that was stored when filing a patent through the innovation engine through the processes of steps 502, 504, 506, 506, 510, 512 and 514), and the like. As the self-executing code at step 516 has now set and locked the new corrected values and information in to the ledger, step 516 can publish itself over the mesh protocol of step 518 and to other nodes at step 510, and the like. Upon arrival to the nodes, the nodes check the published data for integrity and share the acceptance or decline of the updated self-executing code of step 516, and the reasons for doing so, for example, with the data sharing validator device at step 520. The hardware validator device step 522 can also make a determination of whether or not the shared content is confirmed by the secondary channel of air router 402, for example, via sky-waves and/or the internet, as described with respect to FIGS. 1A, 1B, 1C, 1D, 4, and 10. Advantageously, such content can be validated, and the like, with a checksum, and the like, for integrity, timing verification, and the like, by the software validator device at step 524, and the like, by comparing how the data was originally shared in comparison to when it was sent over the secondary channels, and the like.

Figure 6:
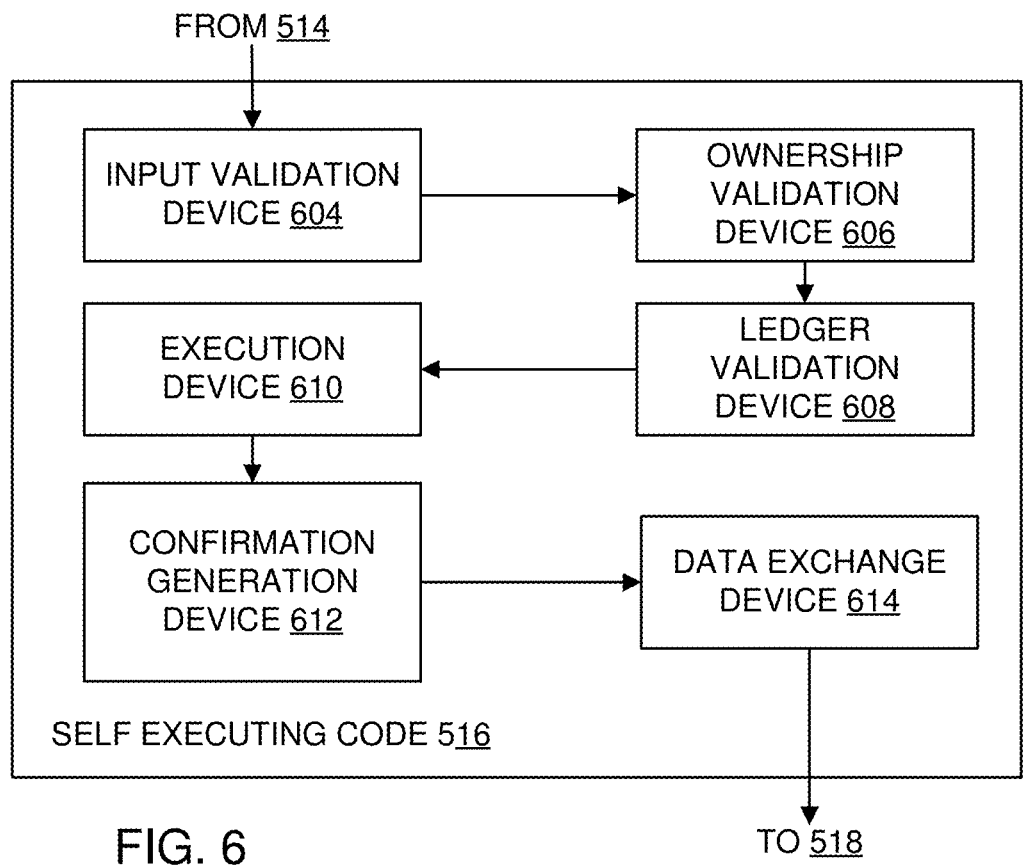
FIG. 6 is a diagram for illustrating self-executing code employed in the innovation engine of FIGS. 1-5 and 7-21.

FIG. 6 is a diagram for illustrating self-executing code employed in the innovation engine of FIGS. 1-5 and 7-21. In FIG. 6, illustrated is the choice sequence of the self-executing contract code of step 516 that stores ownership, validate patent values, and the like. The self-executing code container of step 516 can employ any suitable program that can adapt itself with new content, and a ledger that stores ownership, value, and the like. For example, by calculating a checksum, step 516, for example, can verify the date and information, for example, with respect to when handled, who owns it and to what degree, and the like. Step 516 also can interact with other contracts, and the like, and can adjust parameters thereof, content, value, and the like.

Accordingly, an input validation device, at step 604, determines who or what is being interacted with, checks parameters, with respect to content received, and the like. After step 604, ownership validation is performed at step 606, for example, to determine if a handler of a contract is allowed to alter data in the corresponding self-executing code contract of step 516. Accordingly, step 608 performs checking of a ledger device, for example, for correlation of given parameters versus known parameters, and the like, that are drawn from the ledger itself, and the like. When checked and found legitimate, relevant information can be sent to an execution device for execution at step 610. A confirmation generation device at step 612 performs a peer verification, and the like, with a data exchange device at step 614, over the mesh network at step 518, and the like.

Figure 7:
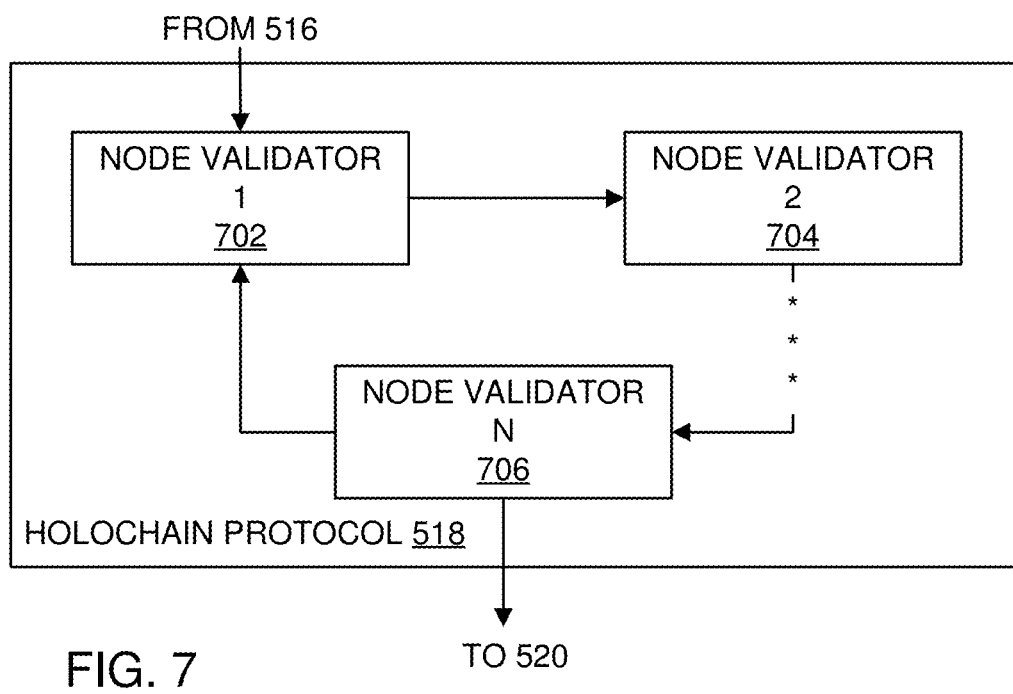
FIG. 7 is a diagram for illustrating a mesh protocol employed in the innovation engine of FIGS. 1-6 and 8-21.

FIG. 7 is a diagram for illustrating a mesh protocol employed in the innovation engine of FIGS. 1-6 and 8-21. In FIG. 7, the mesh protocol validates and retransmits messages and data sent throughout the mesh network. The protocol of step 518, has similarity to other mesh networks, such as holo-chain networks, b.a.t.m.a.n. networks, and the like, for example, with novel advantages with respect to validating the communication with a plurality of node validators at steps 702-706. Such data validation can partly take place over the secondary channel, for example, as described with respect to FIGS. 4-5.

Figure 8:
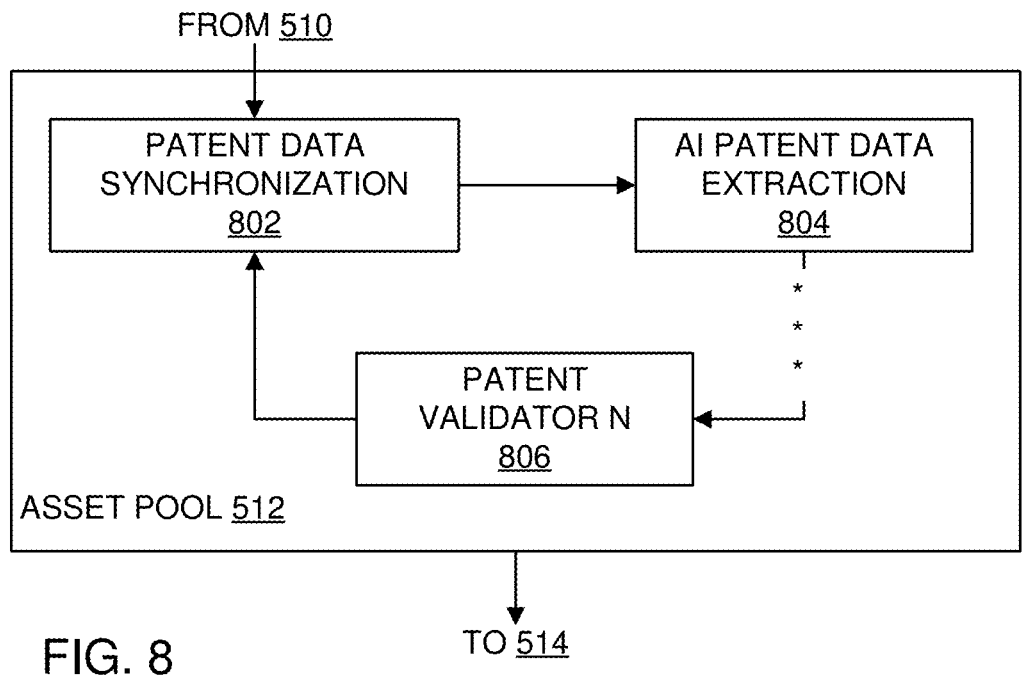
FIG. 8 is a diagram for illustrating an asset pool employed in the innovation engine of FIGS. 1-7 and 9-21.

FIG. 8 is a diagram for illustrating an asset pool employed in the innovation engine of FIGS. 1-7 and 9-21. In FIG. 8, the asset pool step 512 assures the synchronization of all relevant patent data, and categories same to a function, a function group, and the like, in order to validate content thereof. Accordingly, synchronizing the data over the node network is performed at step 802, and the lie. The extracting of new data with the help of any suitable AI filtering algorithm is performed at step 804, and which extracts groups, and the like, patent-related data, and the like (e.g., patent landscaping, patent whitespace, analysis, etc.). At step 806, the resulting information goes through a patent validator device, which checks to see if the extracted data is relevant and related to the patent asset pool of step 512.

Figure 9:
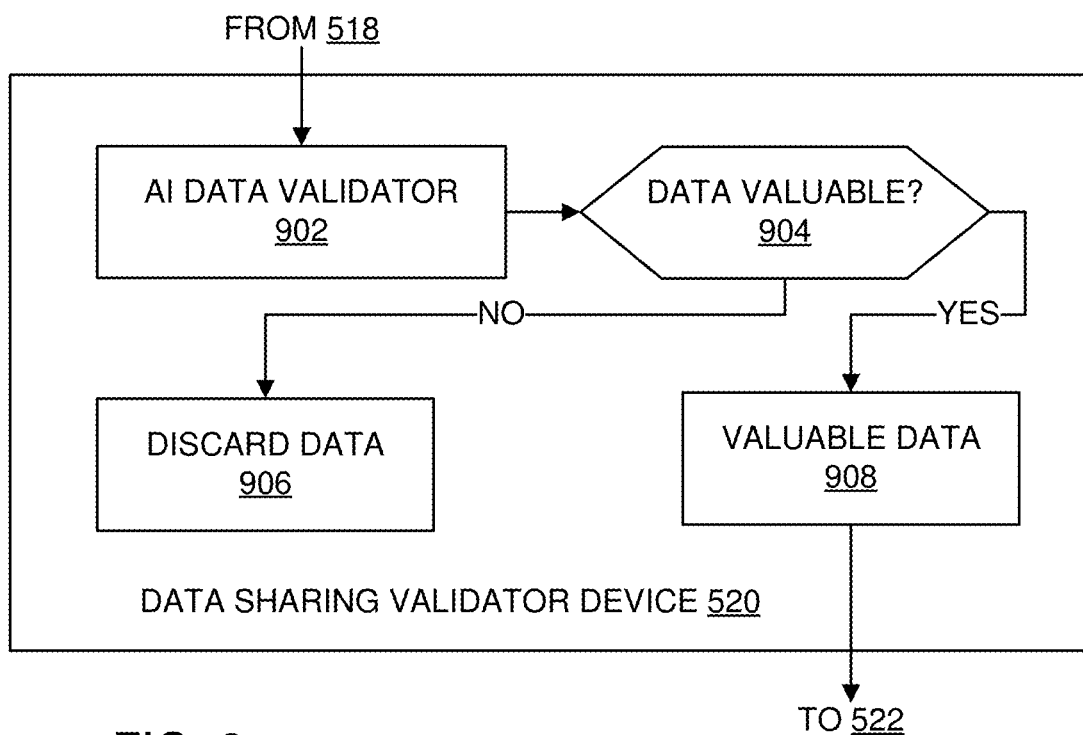
FIG. 9 is a diagram for illustrating a data sharing validator device employed in the innovation engine of FIGS. 1-8 and 10-21.

FIG. 9 is a diagram for illustrating a data sharing validator device employed in the innovation engine of FIGS. 1-8 and 10-21. In FIG. 9, the data sharing validator device step 520 validates data that is shared amongst the mesh network, and tries to predict, determine, and the like, through suitable AI technology, and the like, to which patents the shared data could be valuable, and the like. Accordingly, at step 902, an AI data validator, and the like, assesses the data value that was put in by the asset pool of step 512, and then either stores or discards the data at steps 904, 906, and 908, and the like.

Figure 10:
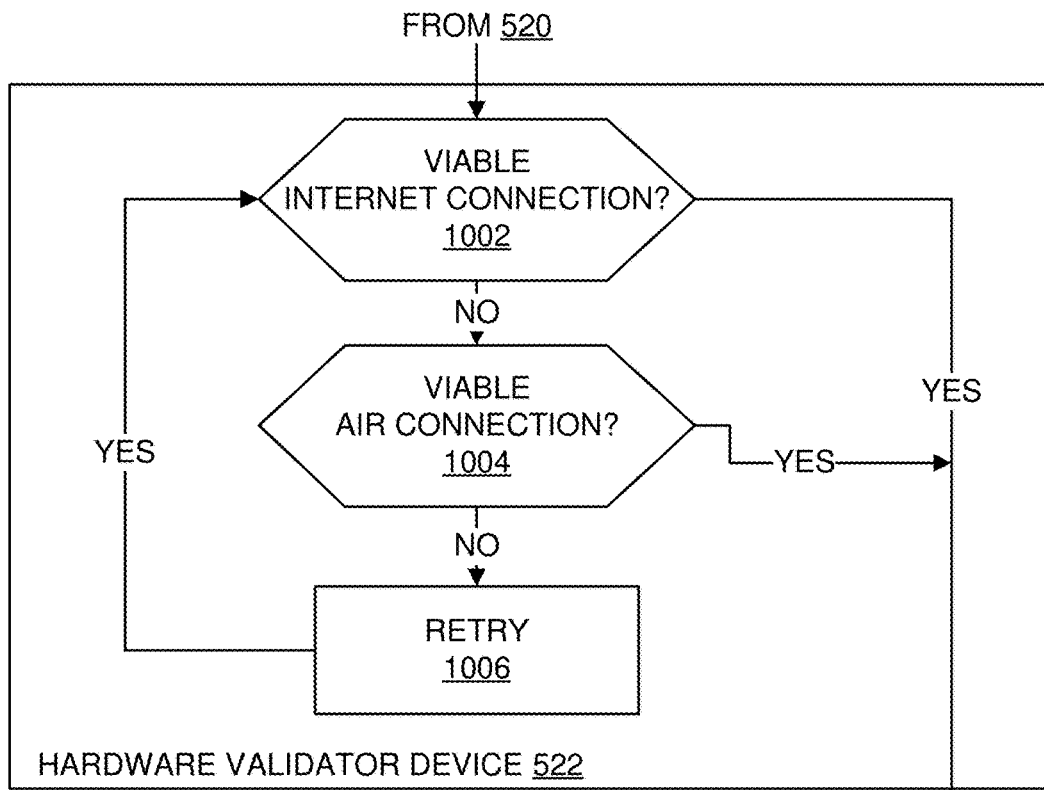
FIG. 10 is a diagram for illustrating a hardware validator device employed in the innovation engine of FIGS. 1-9 and 11-21.

FIG. 10 is a diagram for illustrating a hardware validator device employed in the innovation engine of FIGS. 1-9 and 11-21. In FIG. 10, a hardware validator device assures there is in fact a verified network to connect to, either through the air router 402 or via the mesh network of step 518. Steps 1002, 1004 and 1006 determine if a connection is viable and together make up the hardware validator device step 522.

Figure 11:
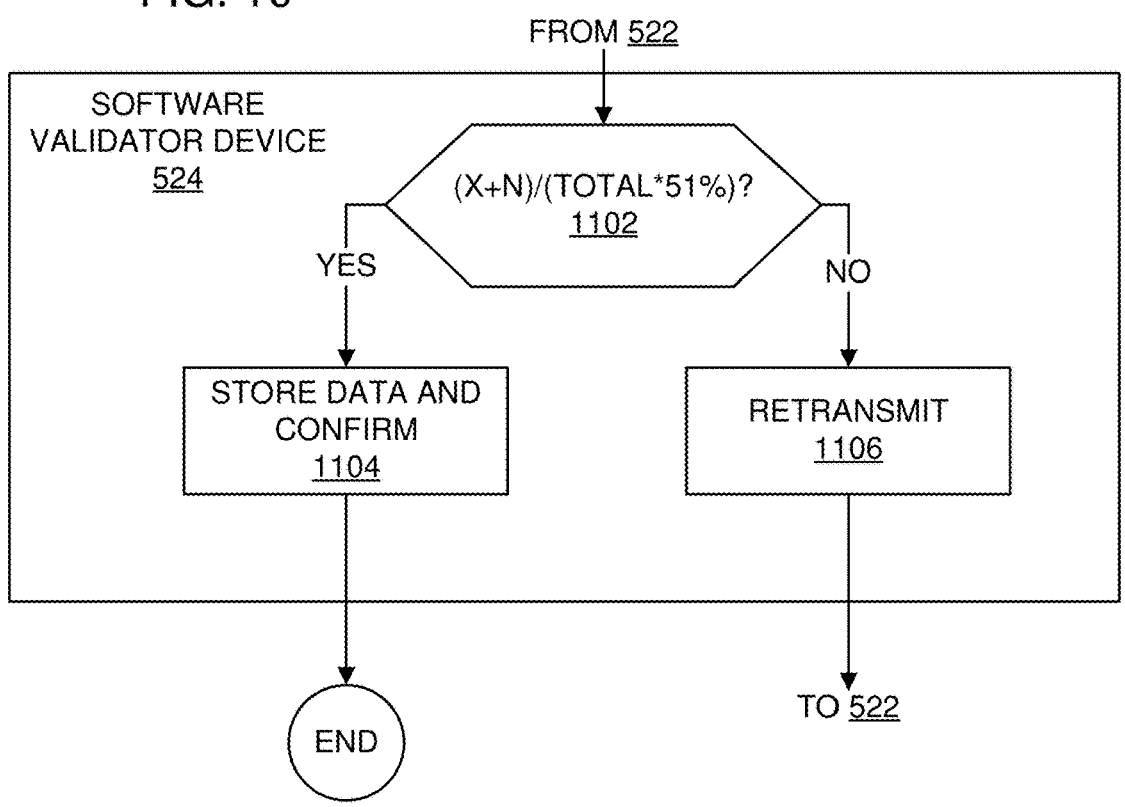
FIG. 11 is a diagram for illustrating a software validator device employed in the innovation engine of FIGS. 1-10 and 12-21.

FIG. 11 is a diagram for illustrating a software validator device employed in the innovation engine of FIGS. 1-10 and 12-21. In FIG. 11, when a connection is validated and shared by the hardware validator device of step 522, a software validation device is employed, which validates shared keys, and the like, and tries to do secondary channel verification via the air router 402, or other suitable routing, and the like. The hardware validator, for example, employs a suitable algorithm at step 1102, which checks for the total nodes that receive the "data that will be validated," and makes a choice based on its own choice, and at least 2 others confirming the legitimacy of transmission. If such parameters are not met, retransmission is requested at step 1106, until a confirmation performed at step 1104.

Figure 12:
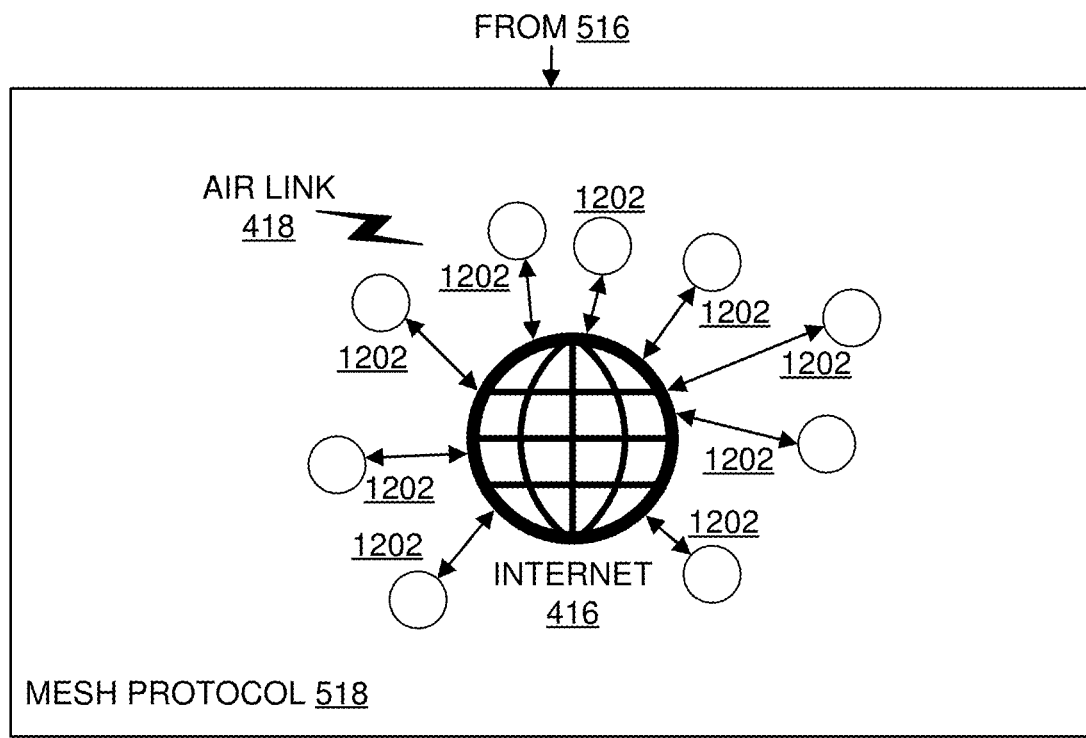
FIG. 12 is a diagram for illustrating node interaction over the mesh protocol employed in the innovation engine of FIGS. 1-11 and 13-21.

FIG. 12 is a diagram for illustrating node interaction over the mesh protocol employed in the innovation engine of FIGS. 1-11 and 13-21. In FIG. 12, the mesh protocol creates a private network over the internet, for example, where all suitable routing data is shared to peers that are closest to each other. Accordingly, the mesh protocol of step 516 can include several nodes at steps 1202 communicating over either the internet 416 and/or via the skywaves 418, where all suitable nodes 1202 can maintain constant contact to route data to each other over such media, and the like.

Figure 13:
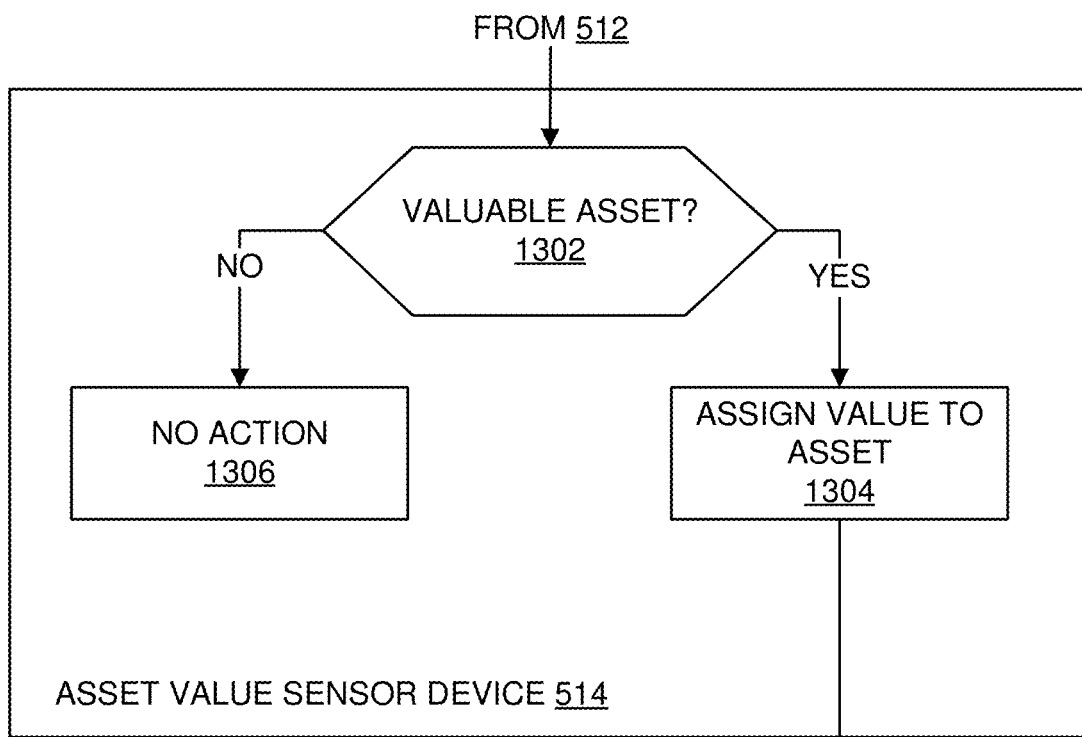
FIG. 13 is a diagram for illustrating an asset value sensor employed in the innovation engine of FIGS. 1-12 and 14-21.

FIG. 13 is a diagram for illustrating an asset value sensor employed in the innovation engine of FIGS. 1-12 and 14-21. In FIG. 13, the asset value sensor ascertains the value, if any, of the newly obtained data sent via the mesh network as described in step 518. Accordingly, determining if an asset is valuable at step 1302, assigning asset value at step 1304, or tasking no action at step 1306 can be part of the asset value sensor step 514.

Figure 14:
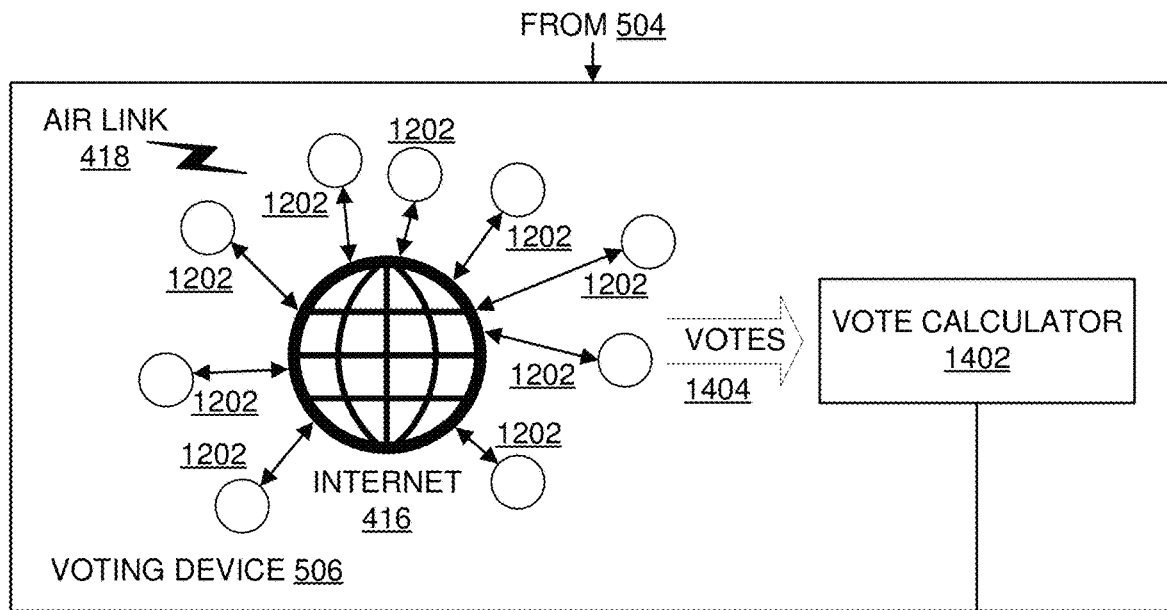
FIG. 14 is a diagram for illustrating a voting device employed in the innovation engine of FIGS. 1-13 and 15-21.

FIG. 14 is a diagram for illustrating a voting device employed in the innovation engine of FIGS. 1-13 and 15-21. In FIG. 14, the voting device commits and calculates votes generated by the respective member users of nodes of step 1202. The voting device of step 506, collects and calculates votes at steps 1402 and 1404 and weighs them when they are received and sent through the mesh network of step 518.

Figure 15:
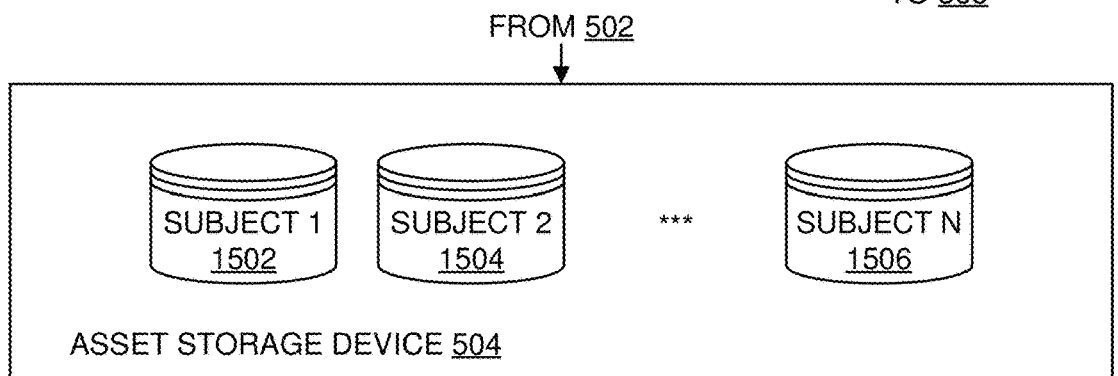
FIG. 15 is a diagram for illustrating an asset storage device employed in the innovation engine of FIGS. 1-14 and 16-21.

FIG. 15 is a diagram for illustrating an asset storage device employed in the innovation engine of FIGS. 1-14 and 16-21. In FIG. 15, the asset storage device, can be a normalized database that is tuned for easy and fast categorized access, as previously described. The results coming from the vote calculator step 1402 are stored as weighing parameters in the asset storage device of step 504 via steps 1502, 1504 and 1506, where various databases store each characteristic separately for easy subject group access, and the like, as previously described.

Figure 16:
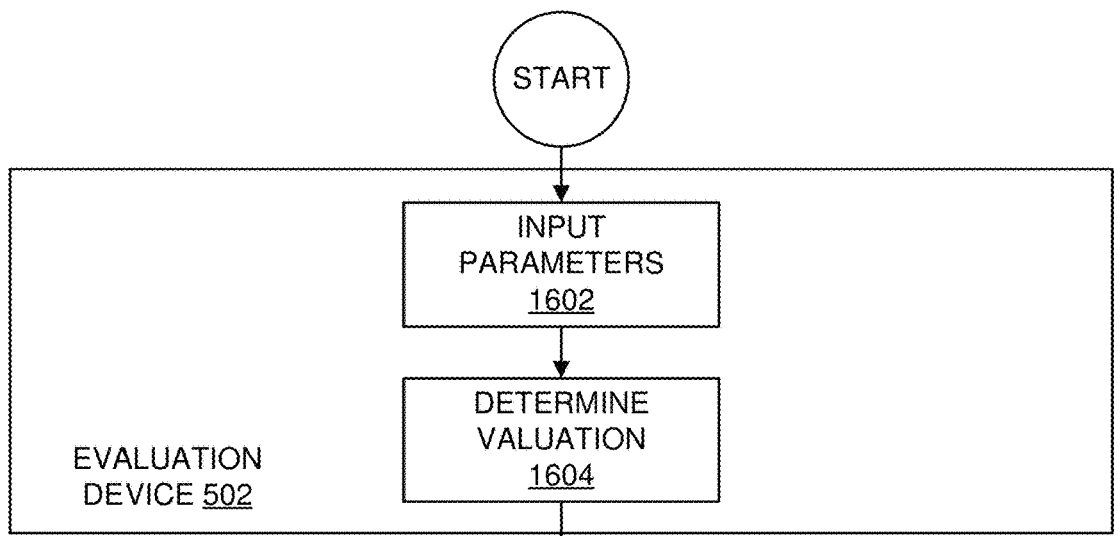
FIG. 16 is a diagram for illustrating an evaluation device employed in the innovation engine of FIGS. 1-15 and 17-21.

FIG. 16 is a diagram for illustrating an evaluation device employed in the innovation engine of FIGS. 1-15 and 17-21. In FIG. 16, the evaluation device of step 502 is the filter that determines the value of an asset or patent based on AI parameters, and the like, as previously described. The parameters, which are gathered from other processes are stored in step 504 and used as input for the evaluation device step 502 in step 1602. As all the suitable patent data can now be grouped and interlinked with patents that have similar features, and the like, and connected to the measured parameters, a value can be determined at step 1604.

Figure 17:
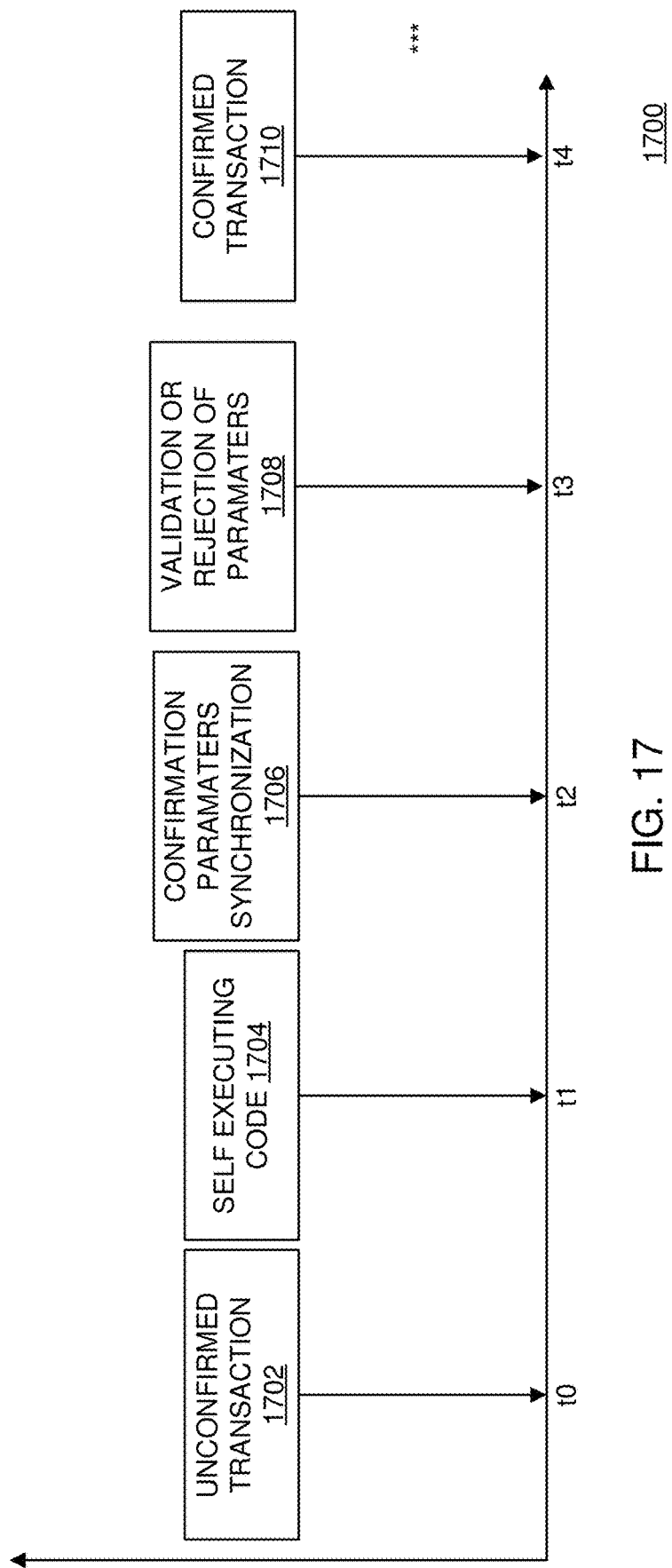
FIG. 17 is a diagram for illustrating an evaluation device employed in the innovation engine of FIGS. 1-16 and 18-21.

FIG. 17 is a diagram for illustrating an evaluation device employed in the innovation engine of FIGS. 1-16 and 18-21. In FIG. 17, shown is the decision chain of a transaction within the innovation engine. From an unfiltered transaction at step 1702, the data flows through the self-executing code at step 1704, and then various of the previously described filters and checks are performed to synchronize with other existing already categorized data at step 1706. Based on such parameters, the data is than either validated or discarded at step 1708, and finally the transaction can be confirmed at step 1710, creating an updated self-executing code contract at step 1704.

Accordingly, an encryption scheme according to the present disclosure can include a novel way of enclosing and obfuscating compressed data inside, for example, a X25519 encryption scheme, and the like, as previously described, advantageously, minimizing the traceability of repeated characters of data to encrypted. In addition, a system for scrubbing malicious code is provided between communications devices, for example, including one or more of the systems, sub-systems and/or devices, as described with respect to FIGS. 1A-1D, and the like.

For example, to hide such above-noted functions, a header and footer are cut off from the compressed data, advantageously, preventing recognition by hackers, third parties, and the like. Advantageously, a shared key principle is partly based on the size of the checksum of the encrypted data, as well as the checksum of the data after compression, but before encryption, by utilizing a size of the data to be encrypted as an input parameter to define the level of compression before encryption, as well as a chosen key curve scheme, and the like. In addition, such size-based parameters are also used to define a cutoff point, and the like, for both header and footer of the encrypted data, and the like.

The air router 402 provides for advantageous and novel secured skywave communications, and the like, and employs low band frequency communication (e.g., skywave communication, etc.), advantageously, securing, and the like, for example, TCP/IP network communications, and the like. For example, employed are translation of an alphabet mapping, and the like, into a set of predetermined sound combinations that represent characters of a character map (e.g., as seen on a regular keyboard, etc.). Advantageously, much higher levels of data compression employed, as compared to conventional technologies, as well providing a mechanism to encrypt, obfuscate, and the like, data, information, and the like.

In this respect, as a tone combination is only as real as a chosen scheme, and the number of characters in it, there are infinite number of combinations possible based on such parameters, while still providing a relatively simple key pair to recognize communicated messages, as compared to conventional technologies. Advantageously, a chosen keypair, for example, can be generated from a frequency employed to communicate the keypair, and a size of the transmission, and the like. By contrast, with conventional radio data communications, and the like, checking for static or real data is a big part of the data transport, and the like, Advantageously, such overhead, and the like, can be eliminated based on the present disclosure, for example, by listening to a specific sinus bandwidth for certain tone libraries, which then in turn are triggers for filtering out the corresponding data, as compared to conventional systems and methods that must sample all data that comes off of an antenna, and the like.

In addition, the present disclosure teaches a novel redistribution of value of assets (e.g., intellectual property, patents, etc.) by employing executable coin contracting, and the like. Such as a scheme, advantageously, can be employed to enumerate intellectual property, and the like, by employing the self-executing code ledger contract, and the like, over a mesh routed network, and the like.

Figure 18:
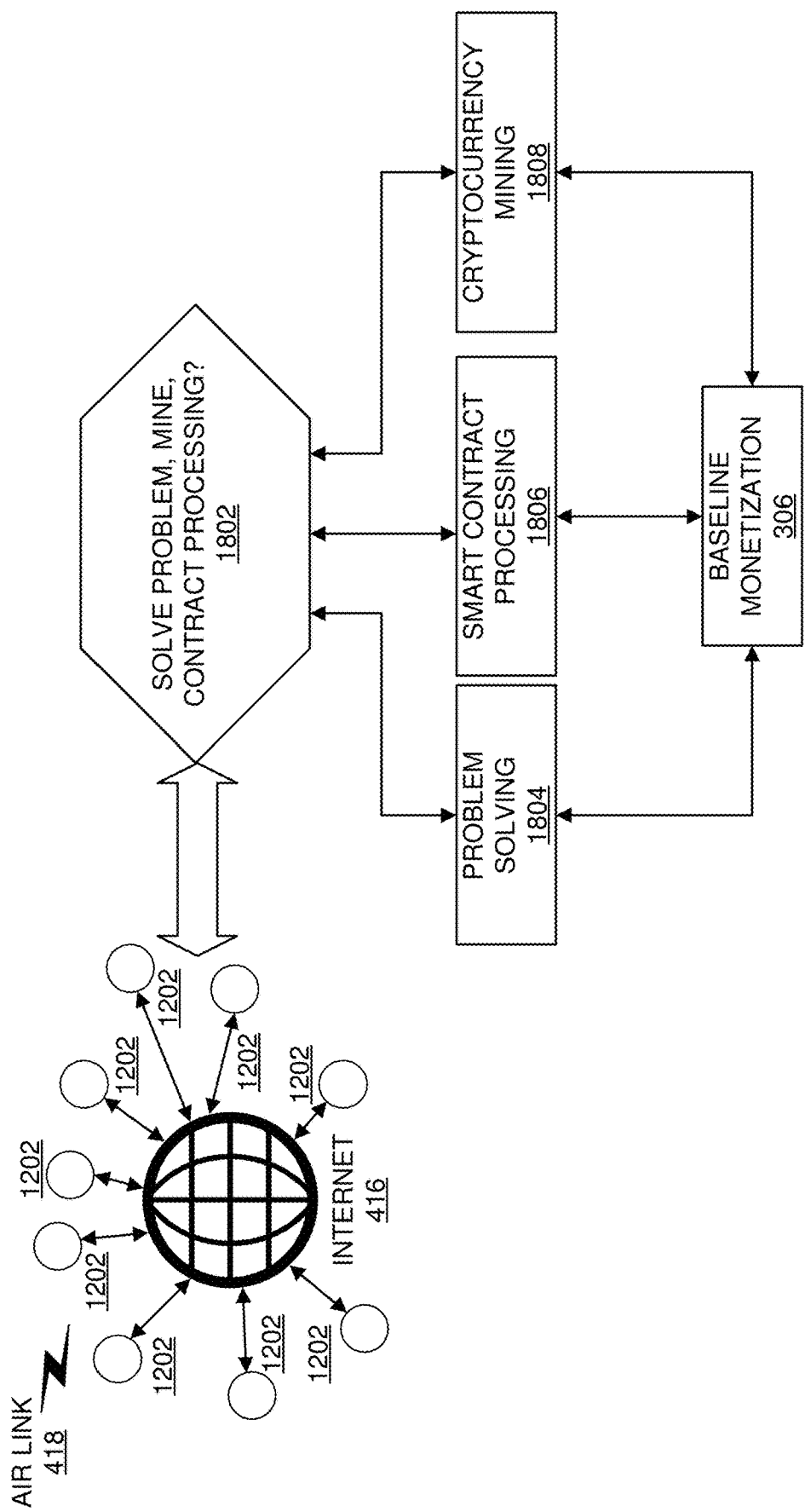
FIG. 18 is a diagram for illustrating node processing including problem solving, cryptocurrency mining, and smart contract processing employed in the innovation engine of FIGS. 1-17 and 19.

FIG. 18 is a diagram for illustrating node processing including problem solving, cryptocurrency mining, and smart contract processing employed in the innovation engine of FIGS. 1-17. In FIG. 18, node processing system 1800 includes one or more of the nodes 1202 that can include multicore processors (not shown) that can be employed as determined at step 1802 in serial and/or parallel manner to perform problem solving at step 1804, smart contract processing at step 1806, and/or cryptocurrency mining at step 1808 with any suitable resulting renumeration sent to the baseline monetization 306. Advantageously, each of the nodes 1202 can process data by itself or the nodes 1202 can be aligned to perform a single process divided over many of the nodes 1202 and/or cores within the nodes 1202. The nodes 1202 can be implemented as part of the air routing platform of FIG. 4, as previously described.

Advantageously, the node processing system 1800 is modular and can be used in various ways such as to solve a computational challenge, which could include finding the number for the 12th position of the Fibonacci sequence, any other suitable problems, and the like. In addition, the node processing system 1800 can be employed to process a smart contract which interacts with existing conditions in other contracts to adapt or change/influence the other contracts, such as, for example, changing the content of a to be filed patent application by inserting new content that is determined to have value. Further, the node processing system 1800 can be used for number crunching, processing bitcoin exchange operations (e.g., mining), and the like.

The nodes 1202 can include hardware capable of hashing data, connecting to other nodes 1202 within the system, and the like, to perform integrity and referencing checks over a duplex medium, such as the air routing platform of FIG. 4, and the like, where one or more of the nodes 1202 send a signal (e.g., data, problem solution, valuation, etc.) with a integrity check that is confirmed on the other medium (e.g., air routed signals checked on network and visa versa). Advantageously, the node processing system 1800 can immediately add value to the base monetization 306, irrespective of the value added by the portfolio assets 310. Advantageously, the nodes 1202 can be used to form an artificial intelligence (AI) engine, and the like.

Figure 19:
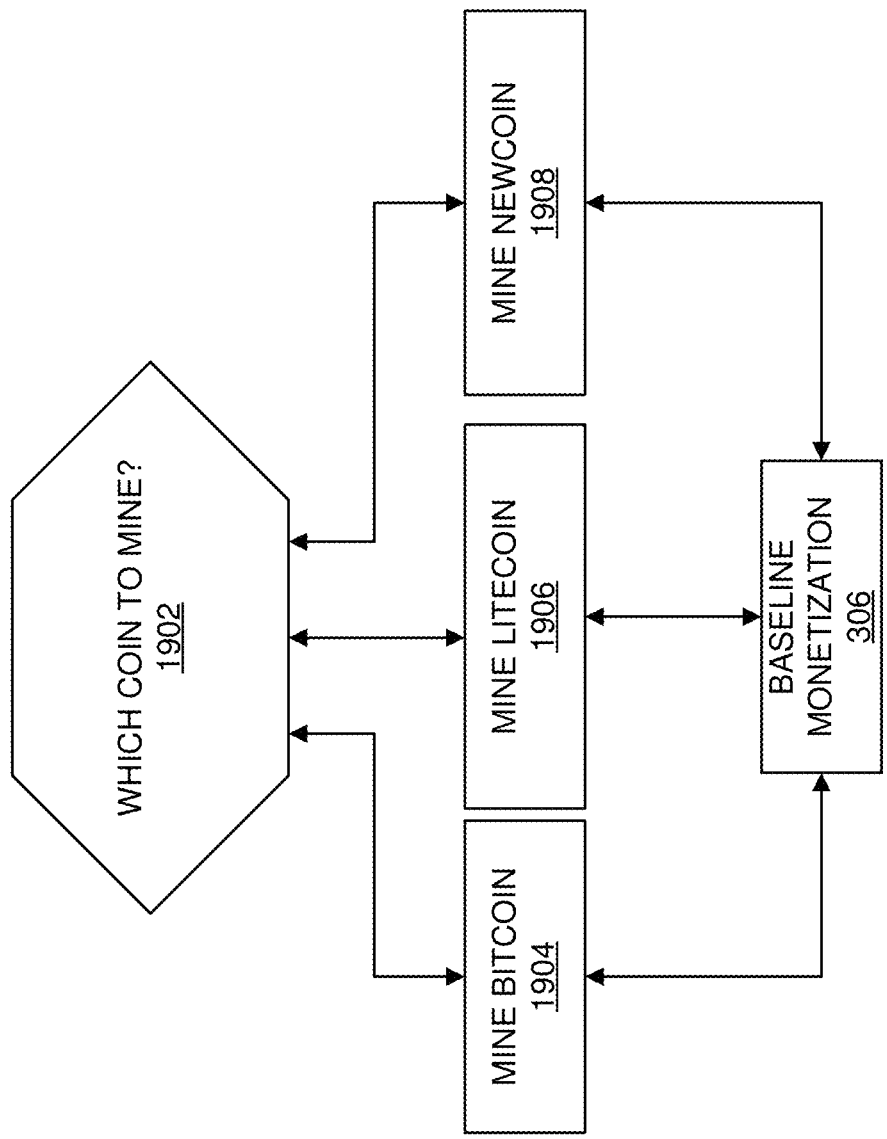
FIG. 19 is a diagram for illustrating cryptocurrency mining employed in the innovation engine of FIGS. 1-18 and 20-21.

FIG. 19 is a diagram for illustrating cryptocurrency mining employed in the innovation engine of FIGS. 1-18 and 20-21. In FIG. 19, cryptocurrency mining is illustrated using the nodes 1202. The process of FIG. 19 can be applied to the problem solving, smart contract processing, previously described, and the like. For example, at step 1902 the nodes 1202 determine which of one or more coins to mine, such as bitcoin, litecoin, a new coin to be developed, and the like. At steps 1904-1908, the one or more respective coins are mined with any suitable resulting renumeration sent to the baseline monetization 306. The determination of which coin(s) to mine can be based on various factors, for example, including actual value, change in value, projected value, polling, based on a suitable artificial intelligence, AI algorithm, and the like.

Figure 20:
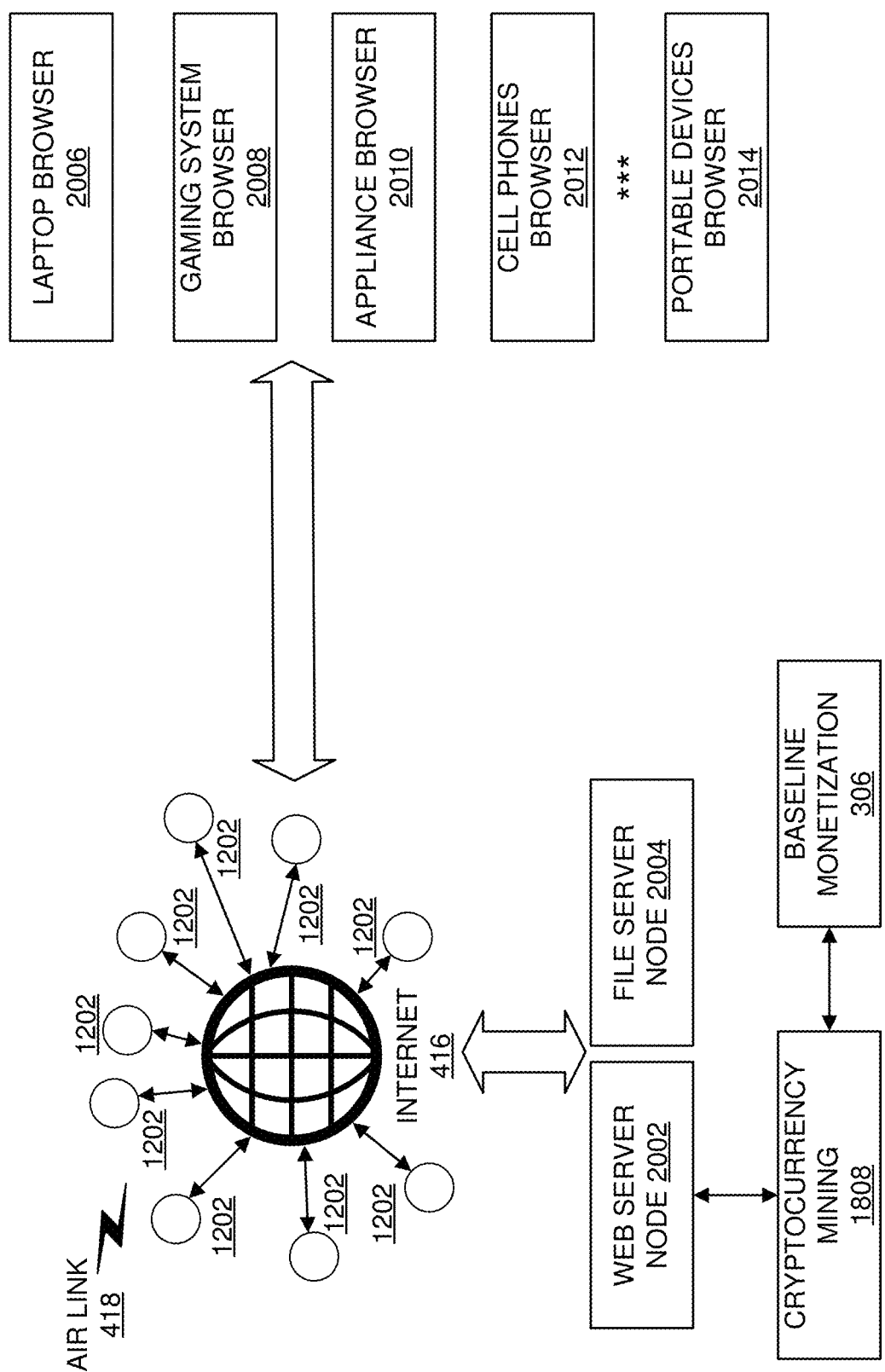
FIG. 20 is a diagram for illustrating multi-device blockchain mining, smart contracting, and the like, employed in the innovation engine of FIGS. 1-19 and 21.

FIG. 20 is a diagram for illustrating multi-device blockchain mining, smart contracting, and the like, employed in the innovation engine of FIGS. 1-19 and 21. In FIG. 20, the multi-device blockchain mining 2000 employed in the innovation engine, includes web server node 2002, and the cryptocurrency mining node 1808, and the baseline monetization node 306, as previously described. The web server node 2002 serves web mining pages through one or more of the nodes 1202 to be served by one more respective browser capable devices 2006-2014 (e.g., laptops 2006, gaming consoles 2008, appliances 2010, cell phones 2012, portable devices 2014, etc.) connected to the node 1202.

For example, the web mining pages can run compiled code as a WebAssembly (wasm) engine, and the like, that can compute blocks of data subsets, and the like. The web server node 2002 serves the wasm engine that allows the devices 2006-2014 to open a client through a web browser via a network supplied by the ring made up of the nodes 1202, for example, on a local network within a VPN, and the like. The devices 2006-2014 compute the mining data subsets and when the mining data is processed correctly, the processed data is sent back to the web server node 2002. The wasm engine running on the devices 2006-2014 can request new computations, as well as serve back computed answers, and the like. Advantageously, the data subsets can include any suitable general, computational data block, and the like (e.g., SETI data, DNA sequencing data, cure for cancer data, traffic control data, AI decision making data, etc.). The web server node 2002 confirms that the received processed data holds value, which is then sent to the baseline monetization 306 for further processing.

Figure 21:
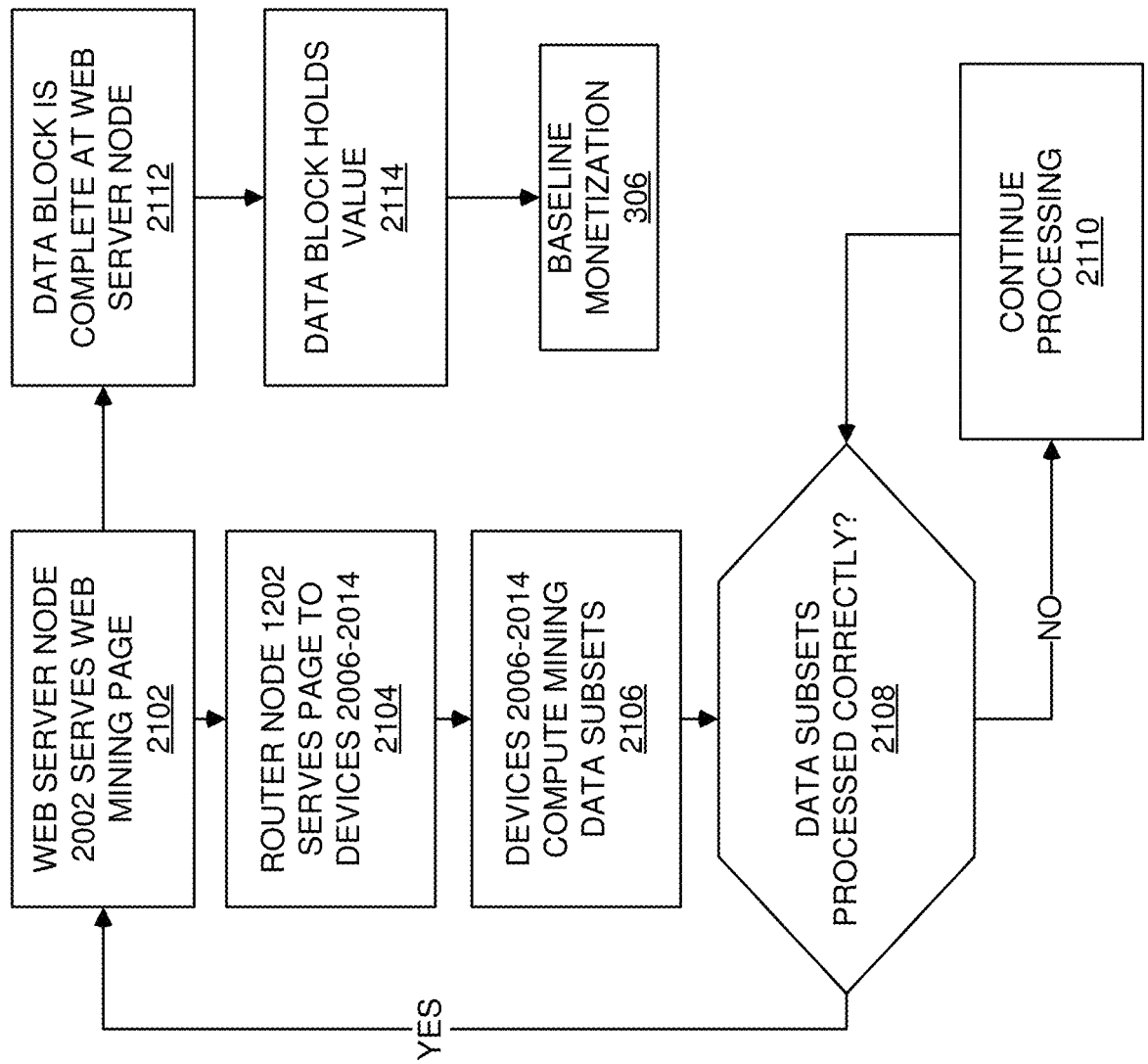
FIG. 21 is a flow chart diagram for illustrating multi-device blockchain mining, smart contracting, and the like, employed in the innovation engine of FIGS. 1-20.

FIG. 21 is a flow chart diagram for illustrating multi-device blockchain mining, smart contracting, and the like, employed in the innovation engine of FIGS. 1-20. In FIG. 21, at step 2102 the web server node 2002 serves the web mining page to the nodes 1202 that at step 2104 serve the respective pages having the wasm engines to the devices 2006-2014. The devices 2006-2014 compute the mining data subsets at step 2106 and step 2108 determines whether or not the data subsets have been processed correctly. If so, control returns to step 2102, and otherwise the processing continues at step 2110. Once the data block is determined to be complete at the web sever node 2002 at step 2112, the data block holds value and at step 2114 is transmitted to the baseline monetization 306, completing the process.

Advantageously, the value that is extracted can be distributed in proportion to amount of data processed, computing power employed, and the like, by the respective nodes 2102, and the like. However, various other sharing options of coins, tokens, and the like, that are mined can be employed and shared in a fair manner, and/or as needed. The baseline monetization 306 can hold various types of value, such as coins, tokens, contracts, solved problems, and/or any suitable form of value that can be remunerated, and the like.

Advantageously, the one or more computing devices 1206-1214 connected to each of the respective node devices 1202 form a mesh network that can be employed to more efficiently, with added speed, and the like, perform the problem solving, smart contract processing, cryptocurrency mining, and the like, as compared to conventional serial processing methods, and systems, and the like.

Although the present invention is described in terms of assets, such as patents, and the like, the present invention is suitable for use with any suitable tangible and/or intangible assets, property, and the like, based on the teachings of the present disclosure, as will be appreciated by those of ordinary skill in the relevant art(s).

The above-described devices and subsystems of the illustrative embodiments can include, for example, any suitable servers, workstations, PCs, laptop computers, PDAs, Internet appliances, handheld devices, cellular telephones, wireless devices, other devices, and the like, capable of performing the processes of the illustrative embodiments. The devices and subsystems of the illustrative embodiments can communicate with each other using any suitable protocol and can be implemented using one or more programmed computer systems or devices.

One or more interface mechanisms can be used with the illustrative embodiments, including, for example, Internet access, telecommunications in any suitable form (e.g., voice, modem, and the like), wireless communications media, and the like. For example, employed communications networks or links can include one or more wireless communications networks, cellular communications networks, G3 communications networks, Public Switched Telephone Network (PSTNs), Packet Data Networks (PDNs), the Internet, intranets, a combination thereof, and the like.

It is to be understood that the devices and subsystems of the illustrative embodiments are for illustrative purposes, as many variations of the specific hardware used to implement the illustrative embodiments are possible, as will be appreciated by those skilled in the relevant art(s). For example, the functionality of one or more of the devices and subsystems of the illustrative embodiments can be implemented via one or more programmed computer systems or devices.

To implement such variations as well as other variations, a single computer system can be programmed to perform the special purpose functions of one or more of the devices and subsystems of the illustrative embodiments. On the other hand, two or more programmed computer systems or devices can be substituted for any one of the devices and subsystems of the illustrative embodiments. Accordingly, principles and advantages of distributed processing, such as redundancy, replication, and the like, also can be implemented, as desired, to increase the robustness and performance of the devices and subsystems of the illustrative embodiments.

The devices and subsystems of the illustrative embodiments can store information relating to various processes described herein. This information can be stored in one or more memories, such as a hard disk, optical disk, magneto-optical disk, RAM, and the like, of the devices and subsystems of the illustrative embodiments. One or more databases of the devices and subsystems of the illustrative embodiments can store the information used to implement the illustrative embodiments of the present inventions. The databases can be organized using data structures (e.g., records, tables, arrays, fields, graphs, trees, lists, and the like) included in one or more memories or storage devices listed herein. The processes described with respect to the illustrative embodiments can include appropriate data structures for storing data collected and/or generated by the processes of the devices and subsystems of the illustrative embodiments in one or more databases thereof.

All or a portion of the devices and subsystems of the illustrative embodiments can be conveniently implemented using one or more general purpose computer systems, microprocessors, digital signal processors, micro-controllers, and the like, programmed according to the teachings of the illustrative embodiments of the present inventions, as will be appreciated by those skilled in the computer and software arts. Appropriate software can be readily prepared by programmers of ordinary skill based on the teachings of the illustrative embodiments, as will be appreciated by those skilled in the software art. Further, the devices and subsystems of the illustrative embodiments can be implemented on the World Wide Web. In addition, the devices and subsystems of the illustrative embodiments can be implemented by the preparation of application-specific integrated circuits or by interconnecting an appropriate network of conventional component circuits, as will be appreciated by those skilled in the electrical art(s). Thus, the illustrative embodiments are not limited to any specific combination of hardware circuitry and/or software.

Stored on any one or on a combination of computer readable media, the illustrative embodiments of the present inventions can include software for controlling the devices and subsystems of the illustrative embodiments, for driving the devices and subsystems of the illustrative embodiments, for enabling the devices and subsystems of the illustrative embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the illustrative embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the illustrative embodiments of the present inventions can be distributed for better performance, reliability, cost, and the like.

As stated above, the devices and subsystems of the illustrative embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of illustrative embodiments, and implementations, the present inventions are not so limited, but rather cover various modifications, and equivalent arrangements, which fall within the purview of the appended claims.

What is claimed is:

1. A system for computer based open innovation, the system comprising:
   an asset valuation device receiving asset information regarding one or more tangible or non-tangible assets, and generating a valuation signal, based on the asset information;
   a virtual ledger code device receiving the valuation signal, and generating a virtual ledger code signal, based on the valuation signal;
   an air router device having both a low band radio channel, and an internet router channel for redundant internet communications data integrity, and including a malicious code removal device for scrubbing malicious code from data received, receiving the valuation signal, and verifying data integrity thereof, and generating a node voting request signal, based on the valuation signal,
   wherein the low band radio channel receives the redundant internet communications before internet router channel for the verifying of the data integrity;
   a mesh network having a plurality of node devices receiving the node voting request signal, and generating vote confirmation signals, based on the node voting request signal; and
   one or more computing devices connected to each of the respective node devices,
   wherein the one or more computing devices of the node devices of the mesh network are employed to perform problem solving, smart contract processing, and/or cryptocurrency mining with data integrity thereof verified by the air router device,
   wherein the one or more computing devices include browser capable devices,
   wherein the node devices include multicore processors operating in serial and/or parallel manner to perform the problem solving, the smart contract processing, and/or the cryptocurrency mining,
   wherein the node devices process data by themselves or are aligned to perform a single process divided over many of the node devices.

2. The system of claim 1, wherein the system collects a predetermined percentage of monetization of assets based on the state of valuation of the assets as a baseline monetization.

3. The system of claim 2, wherein resulting renumeration based on the problem solving, the smart contract processing, and/or the cryptocurrency mining is sent to the baseline monetization.

4. The system of claim 1, wherein the node devices form an artificial intelligence (AI) engine.

5. A computer-implemented method for computer based open innovation, the method comprising:
   receiving with an asset valuation device asset information regarding one or more tangible or non-tangible assets, and generating a valuation signal, based on the asset information;
   receiving with a virtual ledger code device receiving the valuation signal, and generating a virtual ledger code signal, based on the valuation signal;
   receiving with an air router device having both a low band radio channel, and an internet router channel for redundant internet communications data integrity, and including a malicious code removal device for scrubbing malicious code from data received, receiving the valuation signal, and verifying data integrity thereof, and generating a node voting request signal, based on the valuation signal,
   wherein the low band radio channel receives the redundant internet communications before internet router channel for the verifying of the data integrity;
   receiving with a mesh network having a plurality of node devices the node voting request signal, and generating vote confirmation signals, based on the node voting request signal; and
   performing with one or more computing devices connected to each of the respective node devices of the mesh network problem solving, smart contract processing, and/or cryptocurrency mining with data integrity thereof verified by the air router device,
   wherein the one or more computing devices include browser capable devices,
   wherein the node devices include multicore processors operating in serial and/or parallel manner to perform the problem solving, the smart contract processing, and/or the cryptocurrency mining, wherein the node devices process data by themselves or are aligned to perform a single process divided over many of the node devices.

6. The method of claim 5, wherein the system collects a predetermined percentage of monetization of assets based on the state of valuation of the assets as a baseline monetization.

7. The method of claim 6, wherein resulting renumeration based on the problem solving, the smart contract processing, and/or the cryptocurrency mining is sent to the baseline monetization.

8. The method of claim 5, wherein the node devices form an artificial intelligence (AI) engine.

9. A non-transitory computer-readable medium for computer based open innovation and with instructions stored thereon, that when executed by a processor, perform the steps comprising:

receiving with an asset valuation device asset information regarding one or more tangible or non-tangible assets, and generating a valuation signal, based on the asset information;

receiving with a virtual ledger code device receiving the valuation signal, and generating a virtual ledger code signal, based on the valuation signal;

receiving with an air router device having both a low band radio channel, and an internet router channel for redundant internet communications data integrity, and including a malicious code removal device for scrubbing malicious code from data received, receiving the valuation signal, and verifying data integrity thereof, and generating a node voting request signal, based on the valuation signal, wherein the low band radio channel receives the redundant internet communications before internet router channel for the verifying of the data integrity;

receiving with a mesh network having a plurality of node devices the node voting request signal, and generating vote confirmation signals, based on the node voting request signal; and performing with one or more computing devices connected to each of the respective node devices of the mesh network problem solving, smart contract processing, and/or cryptocurrency mining with data integrity thereof verified by the air router device, wherein the one or more computing devices include browser capable devices, wherein the node devices include multicore processors operating in serial and/or parallel manner to perform the problem solving, the smart contract processing, and/or the cryptocurrency mining, wherein the node devices process data by themselves or are aligned to perform a single process divided over many of the node devices.

10. The computer-readable medium of claim 9, wherein the system collects a predetermined percentage of monetization of assets based on the state of valuation of the assets as a baseline monetization.

11. The computer-readable medium of claim 10, wherein resulting renumeration based on the problem solving, the smart contract processing, and/or the cryptocurrency mining is sent to the baseline monetization.

12. The computer-readable medium of claim 9, wherein the node devices form an artificial intelligence (AI) engine.

* * * * *